US011493893B2

(12) United States Patent
Kan

(10) Patent No.: US 11,493,893 B2
(45) Date of Patent: Nov. 8, 2022

(54) INTEGRATED INTELLIGENT BUILDING MANAGEMENT SYSTEM

(71) Applicant: Chicony Power Technology Co., Ltd., New Taipei (TW)

(72) Inventor: Wen-Chi Kan, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 25 days.

(21) Appl. No.: 17/229,803

(22) Filed: Apr. 13, 2021

(65) Prior Publication Data

US 2022/0019184 A1 Jan. 20, 2022

Related U.S. Application Data

(60) Provisional application No. 63/053,543, filed on Jul. 17, 2020.

(30) Foreign Application Priority Data

Feb. 19, 2021 (TW) .................................. 110105704

(51) Int. Cl.
   *G05B 15/02* (2006.01)
   *G06Q 10/06* (2012.01)
   (Continued)

(52) U.S. Cl.
   CPC ......... *G05B 15/02* (2013.01); *G06F 9/44505* (2013.01); *G06F 9/547* (2013.01); *G06Q 10/06313* (2013.01)

(58) Field of Classification Search
   None
   See application file for complete search history.

(56) References Cited

U.S. PATENT DOCUMENTS 10,440,545 B2 10/2019 Horton et al.
10,867,496 B2 12/2020 Laska et al.
(Continued)

FOREIGN PATENT DOCUMENTS

CN 102105751 B 11/2013
CN 207352743 U 5/2018
(Continued)

OTHER PUBLICATIONS

Yu et al.; "Cloud-based building management systems using short-term cooling load forecasting"; 2013; 2013 IEEE Globecom Workshops (GC Wkshps); p. 896-900. (Year: 2013).*
(Continued)

*Primary Examiner* — Umut Onat
(74) *Attorney, Agent, or Firm* — Chun-Ming Shih; HDLS IPR Services

(57) ABSTRACT

An integrated intelligent building management system is disclosed and includes a cloud management system having a cloud configuration platform, an intelligent building system corresponding to a building and having a ground configuration platform, and an intelligent building kit connected with multiple equipment in the building. The cloud configuration platform establishes multiple cloud configuration files. The intelligent building system obtains one cloud configuration file according to the MAC address and performs a ground configuration procedure confined by the cloud configuration file. When the intelligent building kit communicates with the intelligent building system, the ground configuration platform activates a configuration module corresponding to the kit category of the intelligent building kit to perform configuration to the intelligent building kit and establishes a ground configuration file, and the ground configuration platform exports the ground configu- (Continued)

ration file to the intelligent building kit to finish the ground configuration procedure.

20 Claims, 20 Drawing Sheets

(51) Int. Cl.
  *G06F 9/54* (2006.01)
  *G06F 9/445* (2018.01)

(56) References Cited

U.S. PATENT DOCUMENTS

| | | |
|---|---|---|
| 2015/0355609 A1 | 12/2015 | Warren |
| 2016/0313751 A1* | 10/2016 | Risbeck ................ G05B 15/02 |
| 2016/0334825 A1 | 11/2016 | Nesler et al. |
| 2018/0191521 A1 | 7/2018 | Ahmed et al. |
| 2019/0107832 A1 | 4/2019 | Strand et al. |
| 2019/0109907 A1 | 4/2019 | Duraisingh |
| 2020/0026249 A1 | 1/2020 | Przybylski et al. |
| 2020/0162280 A1* | 5/2020 | Drees .................... G06N 7/005 |
| 2020/0218210 A1 | 7/2020 | Deshpande et al. |
| 2020/0233680 A1 | 7/2020 | Ma et al. |

FOREIGN PATENT DOCUMENTS

| | | |
|---|---|---|
| TW | I469070 B | 1/2015 |
| TW | 201513040 A | 4/2015 |
| TW | I492185 B | 7/2015 |
| TW | 201706946 A | 2/2017 |
| TW | I634511 B | 9/2018 |

OTHER PUBLICATIONS

Non-Patent Literature from Internet, kingview, 6.53 version, User Manual, WellinTech, 2007, http://www.dgt-factory.com/uploads/2018/07/0701-0705/%E7%BB%84%E6%80%81%E7%8E%8B%E4%BD%BF%E7%94%A8%E6%89%8B%E5%86%8C%EF%BC%88%E5%AE%8C%E5%85%A8%E7%89%88%EF%BC%89.pdf, Chapters 2, 6, 7, Appendix C.
Office Action dated May 20, 2022 of the corresponding Taiwan patent application No. 110105704.

* cited by examiner

Establishing project

① General configuration
② Platform configuration
③ System configuration
④ Brand and model
⑤ Building information model Project name : ☐
Building name : ☐
Building location : ☐
MAC address of intelligent management system :
☐

[Next] [Cancel]

FIG.4A

Establishing project

✓ General configuration
② Platform configuration
③ System configuration
④ Brand and model
⑤ Building information model Platform
☑ Building automation system (BAS)
☑ Energy management system (EMS)
☐ Facility management system (FMS)

Building information model (BIM)
☑ Activate

[Back] [Next] [Cancel]

FIG.4B

Establishing project — FIG.4C (1110)

Left panel (steps):
- ✓ General configuration
- ✓ Platform configuration
- ③ System configuration
- ④ Brand and model
- ⑤ Building information model Right panel:
☐ Select all

| ☑ Lighting system | ☑ HVAC system |
| ☐ Elevator system | ☐ Plumbing system |
| ☑ Electricity system | ☐ Disaster prevention system |
| ☐ Cooling system | ☐ Shading system |
| ☐ Monitoring sys tem | ☐ Parking lot system |

[Back] [Next] [Cancel]

FIG.4C

Establishing project — FIG.4D (1110)

Left panel (steps):
- ✓ General configuration
- ✓ Platform configuration
- ✓ System configuration
- ④ Brand and model
- ⑤ Building information model Right panel:
- ☑ Lighting system
- ☐ HVAC system
- ☐ Electricity system
  - ☐ Power_Meter_PM001
  - ☐ Power_Meter_EMA001
  - ☑ Power_Meter_EMV001
  - ☑ Power_Meter_DTSD1000

[Back] [Next] [Cancel]

FIG.4D

Configuration sheet

| Package | Communication protocol | Data format | Byte sequence |
|---|---|---|---|
| xxxxxxxx | Modbus ▽ | Decimal ▽ | Big-endian ▽ |

[+]

1131 →

| Property | Modbus address | Function code | Data type | Description |
|---|---|---|---|---|
| Activate/Deactivate control | 1011 | 03/06 | Boolean | 0-OFF, 1-ON |
| Humidity configuration control | 1012 | 03/06 | Unsigned Short AB | 0-OFF, 1-ON |
| Air humidity control | 1013 | 03 | Unsigned Short AB | 30-90% |

[Store] [Cancel]

| 1 | Whole area | 69173.5m² | ✎ |
|---|---|---|---|
| 2 | 1st floor | 739m² | ✎ |
| 3 | 2nd floor\| whole area | 692m² | ✎ |
| 4 | 2nd floor\| east side | 326.8m² | ✎ |

Device

| Serial number | Device name | System | Package |
|---|---|---|---|
| 1 | 2nd floor power meter 1-east side | Electricity system | Power_Meter_PM001 |
| 2 | 2nd floor power meter 2-east side | Electricity system | Power_Meter_PM001 |

INTEGRATED INTELLIGENT BUILDING MANAGEMENT SYSTEM

BACKGROUND

Technical Field

This disclosure relates to a building system, and particularly relates to integrated building management system

Description of Related Art

In recent years, with the development in the technologies of computer, Internet and big data, all kinds of management operation of buildings are developed in the direction toward intellectualization to improve the living quality or working performance of the users inside the buildings.

Generally, the related-art intelligent building management system emphasizes on the integration between the independent sub-systems, such as an access control system, a lighting system, an air-conditioning system, etc. Further, a friendly graphic interface is used to provide the integrated information and the function of linking control, such as activating the lighting system and the air-conditioning system simultaneously when the user arrives home, for the users to enhance the accessibility.

However, with the increasing of the number of building cases, the developers need to consider certain conditions such as the equipment categories, communication protocol, control method, etc., of various buildings, and auxiliary equipment thereof are becoming more and more complicated. As a result, the related-art management systems may be insufficient for the deployment and configuration of the objects, such as the sub-systems, equipment, etc.

For example, the sub-systems may be configured by multiple equipment and one building may have multiple sub-systems inside, such as the lighting system, air-conditioning system, etc., and one project may have multiple buildings simultaneously, such as multiple factories of one company in the same area, and one project manager may need to manage multiple projects simultaneously, for example the manager of the headquarter may have to manage multiple buildings for multiple worldwide branches.

As mentioned above, if the related-art management system is adopted, the manager has to configure every building included in the project one by one. Even the system or equipment adopted in each building is the same or similar, the manager still has to configure the system or equipment in each building one by one through editing the system or equipment control codes. The operation is fairly troublesome.

As mentioned above, the related-art configuration method of the building has relatively higher configuration threshold and requires more configuration time. Therefore, the implementation and management costs of the building are increased.

SUMMARY OF THE DISCLOSURE

The object of this disclosure is to provide an integrated intelligent building management system for elevating the configuration procedure of the building to the cloud layer. Multiple platforms, systems, equipment, etc., required by the ground are configured priorly on the cloud to save and optimize the configuration procedures that need to be executed on the ground by the manager, and facilitate the repeating usage of required data during practical implementation for the manager.

In some embodiments of present disclosure, an integrated intelligent building management system includes a cloud management system, an intelligent building system and an intelligent building kit. The cloud management system is disposed on a cloud space and having a cloud configuration platform for establishing a plurality of cloud configuration files. Each cloud configuration file records a set of media access control address (MAC address). The intelligent building system is corresponding to a building and having a ground configuration platform. The intelligent building system has a set of specific MAC address and obtains the cloud configuration file correspondingly based on the set of specific MAC address. The ground configuration platform is confined by the cloud configuration file for a manager to perform a configuration procedure correspondingly and generate a ground configuration file. The intelligent building kit has a kit category, and is connected to at least one equipment disposed in the building, and obtains an equipment parameter of the equipment periodically based on a configuration.

When the intelligent building kit communicates with the intelligent building system, the ground configuration platform activates a configuration module correspondingly according to the kit category, the configuration module configures the intelligent building kit and generates the ground configuration file, and the intelligent building system exports the ground configuration file to the intelligent building kit to finish the configuration procedure for the intelligent building kit.

Comparing to the related-art, this disclosure may achieve the technical functions as below. When the manager practically configures the building on the ground, the manager may follow contents of the cloud configuration file to perform confined ground configuration operation. Thus, the overall configuration efficiency may be improved and the risk of erroneously configuring may be decreased at the same time. Further, the equipment data of all equipment required by the ground configuration procedure is recorded on the cloud to facilitate the repeating usage of the same equipment data across different buildings for the manager. The repeated editing for the equipment control codes is not necessarily. The configuration threshold may be lowered and the required time for configuration may be decreased.

BRIEF DESCRIPTION OF THE DRAWINGS

FIG. 4A is a schematic view of the project establishment page in the first embodiment of this disclosure.

FIG. 4B is a schematic view of the project establishment page in the second embodiment of this disclosure.

FIG. 4C is a schematic view of the project establishment page in the third embodiment of this disclosure.

FIG. 4D is a schematic view of the project establishment page in the fourth embodiment of this disclosure.

FIG. 6 is a schematic view of the equipment configuration page in the first embodiment of this disclosure.

FIG. 8A is a schematic view of the area configuration in the first embodiment of this disclosure.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
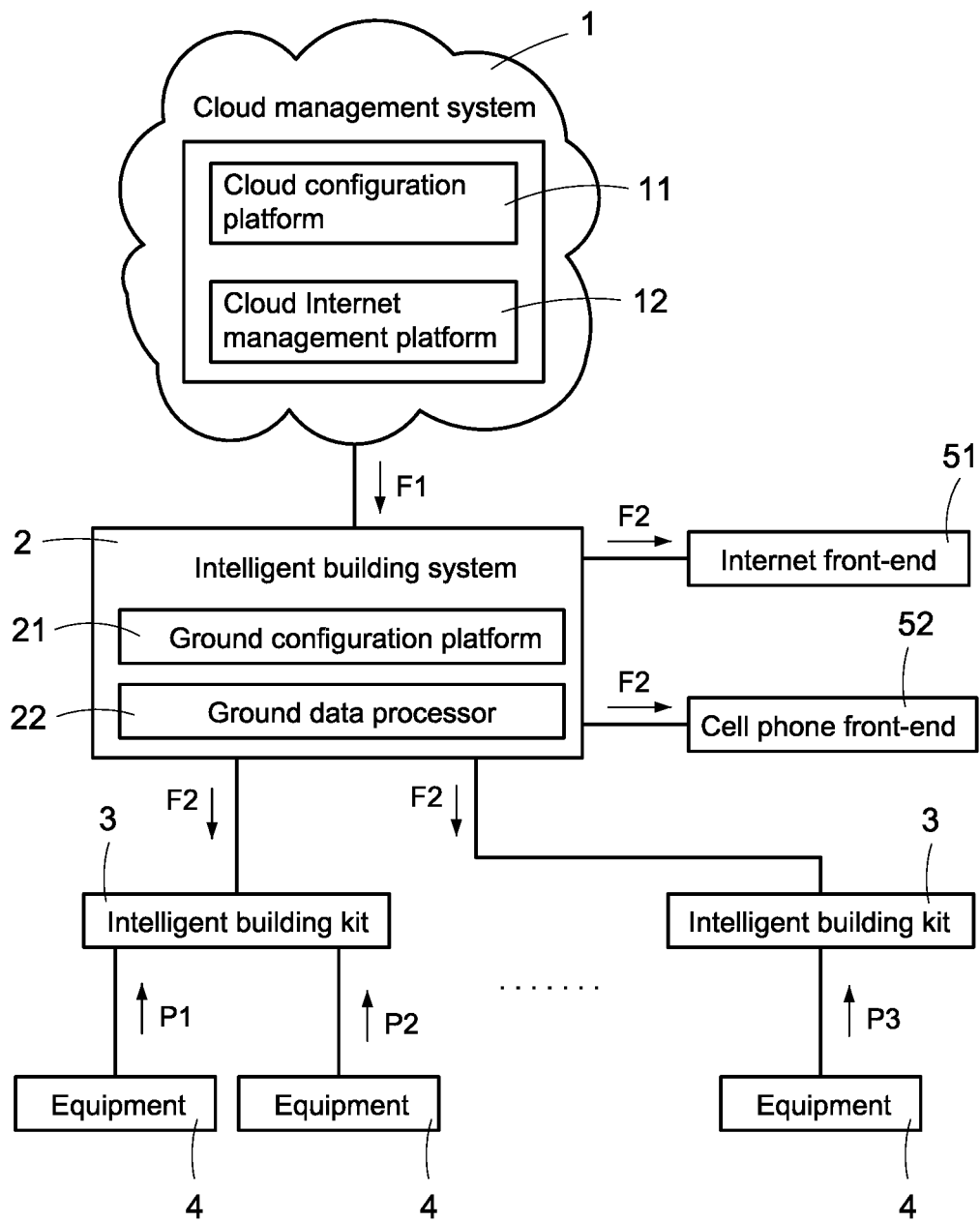
FIG. 1 is a schematic view of the integrated system in the first embodiment of this disclosure.

Refer to FIG. 1, which is a schematic view of the integrated system in the first embodiment of this disclosure. Refer to FIG. 1, this disclosure provides an integrated intelligent building management system. The integrated intelligent building management system at least includes a cloud management system 1 and one or multiple intelligent building systems 2. One intelligent building system 2 is corresponding to one building (not shown in figures) to perform configuration, management, and data collection and analyzation for multiple equipment 4 practically implemented inside the building. The embodiment in FIG. 1 is using single intelligent building system 2 managing single building as an example, here is not intended to be limiting.

In some embodiments, the cloud management system 1 may be a virtual system established on the cloud space, such as AMAZON WEB SERVICES™ (AWS™), for managing one or multiple projects. Each project at least includes all of the buildings managed (being in charge of) by all of the intelligent building systems 2 communicating with the cloud management system 1. In some embodiments, the intelligent building system 2 is implemented by the combination of the physical computer or server and corresponding function software, and is corresponding to at least one building. The intelligent building system 2 connects the multiple equipment 4 in the building in a wired or wireless manner.

The integrated intelligent building management system of this disclosure further includes at least one intelligent building kit 3. The intelligent building kit 3 may be a programmable physical equipment, computer or server for practically connecting at least one equipment 4 disposed in the building, and periodically obtain the equipment parameters P1-P3 of the connected equipment 4 based on the inside setting.

As shown in FIG. 1, the cloud management system 1 at least has a cloud configuration platform 11. The intelligent building system 2 at least has a ground configuration platform 21. In some embodiments, the manager may use a management terminal, such as a personal computer, a smart phone, a tablet, etc., to connect the Internet, and to connect and operate the cloud management system 1 through the Internet. The cloud management system 1 may provide operation interface and accept the external operation from the manager through the cloud configuration platform 11 to establish multiple cloud configuration files F1. In some embodiments, each cloud configuration file F1 records the media access control addresses (MAC addresses) of different intelligent building systems 2 respectively, and records the configuration contents required by the building being in charge of by each intelligent building system 2 respectively.

In some embodiments, the intelligent building system 2 has a set of specific MAC address. When the intelligent building system 2 is activated, the intelligent building system 2 may obtain a cloud configuration file F1 correspondingly based on the MAC address thereof and perform the configuration procedure of the ground through the obtained cloud configuration file F1.

Specifically, when the intelligent building system 2 is activated, the intelligent building system 2 may import the cloud configuration file F1 in an online or offline manner. In some embodiments, the intelligent building system 2 sends out the request of importing configuration file to the cloud management system 1 through the ground configuration platform 21 after being activated. When the cloud management system 1 receives the request, the cloud management system 1 authenticates the received MAC address and determines whether the cloud configuration file F1 corresponding to the MAC address is existent. When the cloud configuration file F1 corresponding to the MAC address is existent, the cloud management system 1 makes the ground configuration platform 21 directly download and import the cloud configuration file F1.

In some embodiments, the manager may store the cloud configuration file F1 to the portable storage equipment after the cloud management system 1 generates the cloud configuration file F1. When the intelligent building system 2 is activated, the manager connects the portable storage equipment to the intelligent building system 2. At the time, the ground configuration platform 21 authenticates whether the MAC address recorded in the cloud configuration file F1 stored in the portable storage equipment is consistent with the MAC address of the intelligent building system 2, and directly imports the cloud configuration file F1 from the portable storage equipment to the intelligent building system 2 when consistency is determined.

The intelligent building system 2 is corresponding to at least one building, and the cloud configuration file F1 imported by the intelligent building system 2 records all of the configuration contents required by the building. One technical feature of this disclosure is that the ground configuration platform 21 of the intelligent building system 2 is confined by contents of the imported cloud configuration file F1 for the manager to perform corresponding configuration procedure, and to generate corresponding ground configuration file (described hereafter).

In some embodiments, the intelligent building system 2 releases the ground configuration file F2, which is generated after the configuration is finished, to the connected Internet front-end 51 and cell phone front-end 52, and makes the Internet front-end 51 and the cell phone front-end 52 perform configuration operation to themselves based on contents of the ground configuration file F2. For example, the Internet front-end 51 and the cell phone front-end 52 may provide corresponding displaying page based on contents of the ground configuration file F2, thereby the user may send out the request of querying data to the intelligent building system 2 through the displaying page, and directly acquire required data, such as equipment parameters P1-P3, statistical diagram, etc., from the Internet page or cell phone page.

In some embodiments, the cloud management system 1 further includes a cloud Internet management platform 12. The cloud Internet management platform 12 may provide a real-time information display module and an alarm module (not shown in figures) through the Internet front-end or the cell phone front-end. Thus, the user may connect the terminal to the Internet front-end or the cell phone front-end to acquire the real-time information related to the cloud configuration procedure through the real-time information display module, and to acquire the related alarm message through the alarm module when error occurs in the cloud configuration procedure.

In some embodiments, the intelligent building system 2 further includes a ground data processor 22. The ground data processor 22 is used to perform a statistical analysis to the data collected by the intelligent building system 2. Specifically, the intelligent building system 2 connects the multiple equipment 4 in the building through the intelligent building kit 3 and collects the equipment parameters P1-P3 of the equipment 4. Further, the intelligent building system 2 performs the statistical analysis and recordation to the equipment parameters P1-P3 through the ground data processor 22.

It should be noted that the intelligent building system 2 processes a command request, such as the request of querying the equipment parameter of the specific equipment or analyzing data, received from the Internet front-end 51 and the cell phone front-end 52 through the ground data processor 22. In some embodiments, the intelligent building system 2 may conduct the ground data processor 22 as an interfacing module with the cloud management system 1. Specifically, the intelligent building system 2 collects and compiles the data uploaded by the intelligent building kit 3, such as the equipment parameters P1-P3, analyzed data, etc., through the ground data processor 22, and uploads that to the cloud management system 1 for the user to search and use on the cloud management system 1.

The intelligent building kit 3 is used to connect at least one equipment 4 disposed in the building. One technical feature of this disclosure is that one intelligent building kit 3 is used to connect one or multiple equipment 4 with a specific category and pre-configured with a corresponding kit category based on the specific category. When the intelligent building kit 3 communicates with the intelligent building system 2, the ground configuration platform 21 activates a corresponding configuration module (not shown in figures) according to the kit category of the intelligent building kit 3. In some embodiments, the manager is permitted to configure the intelligent building kit 3 through the configuration module only when the configuration module is activated, and records the configuration contents to the ground configuration file F2. The intelligent building system 2 exports the generated ground configuration file F2 to the intelligent building kit 3 to complete the configuration procedure to the intelligent building kit 3 (described hereafter).

Figure 2:
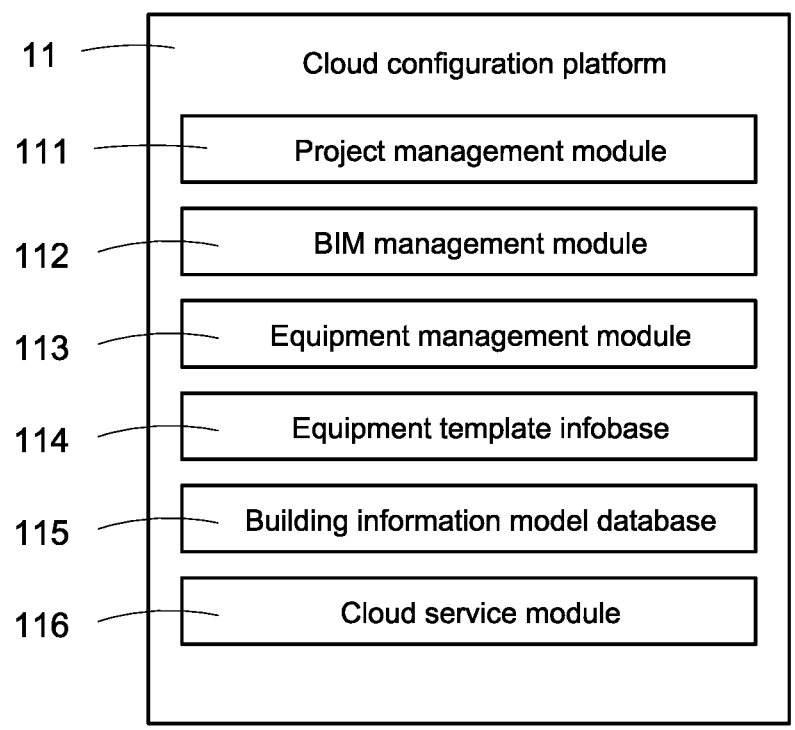
FIG. 2 is a block diagram of the cloud configuration platform in the first embodiment of this disclosure.

Refer together with FIG. 2, which is a block diagram of the cloud configuration platform in the first embodiment of this disclosure.

In this disclosure, the cloud configuration platform 11 is implemented on the cloud management system 1 in a software manner, and provides the online page of editing and establishing the cloud configuration file F1 for the manager. The cloud management system 1 may logically divide the cloud configuration platform 11 into a project management module 111, a building information model management module 112, an equipment management module 113, an equipment template infobase 114 and a building information model database 115 based on all of the achievable functions of the cloud configuration platform 11. In other words, the project management module 111, the building information model management module 112 and the equipment management module 113 are the programmable software module. The equipment template infobase 114 and the building information model database 115 are the virtual database implemented by software.

Figure 3:
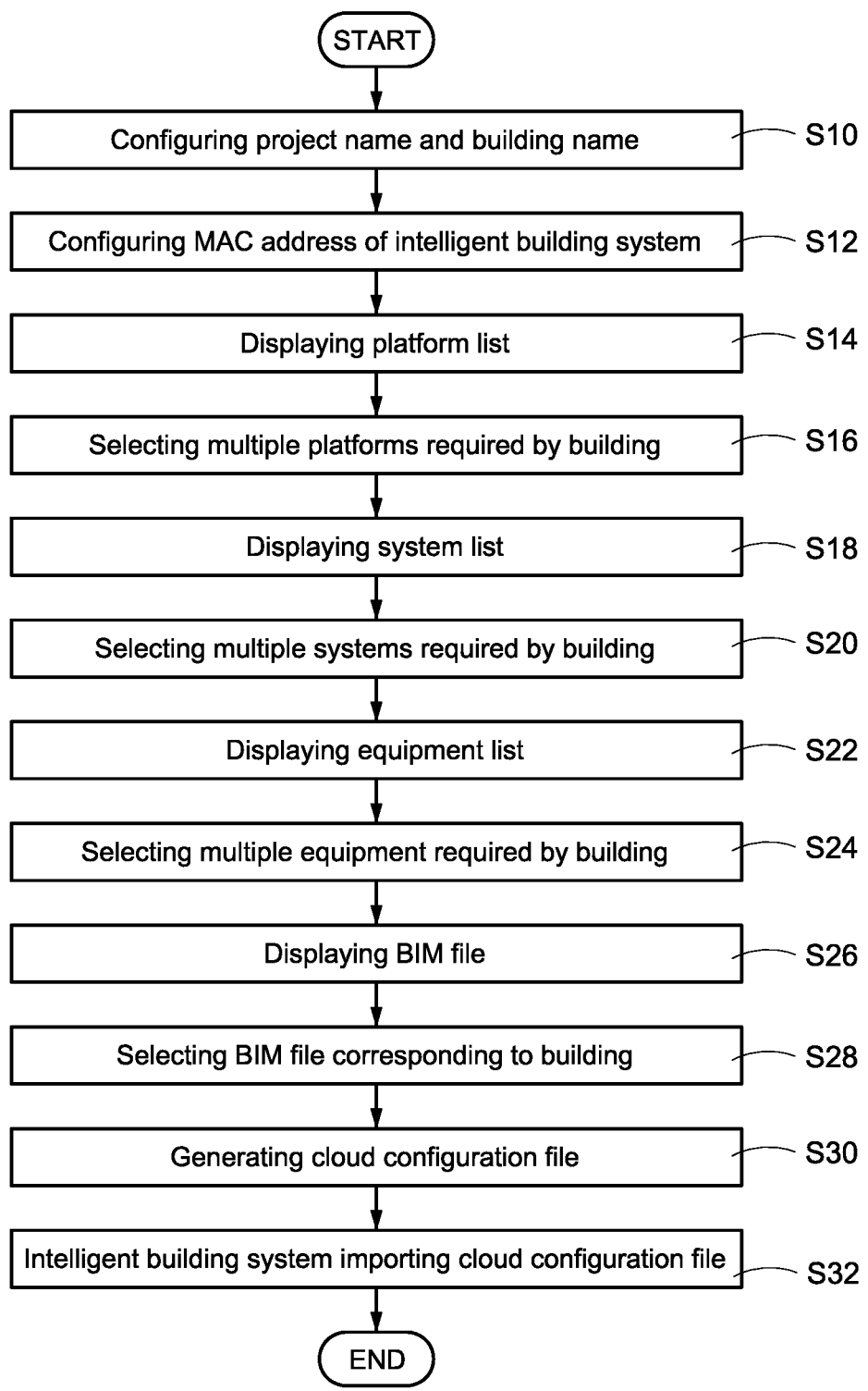
FIG. 3 is a flowchart of the cloud configuration in the first embodiment of this disclosure.
Figure 4E:
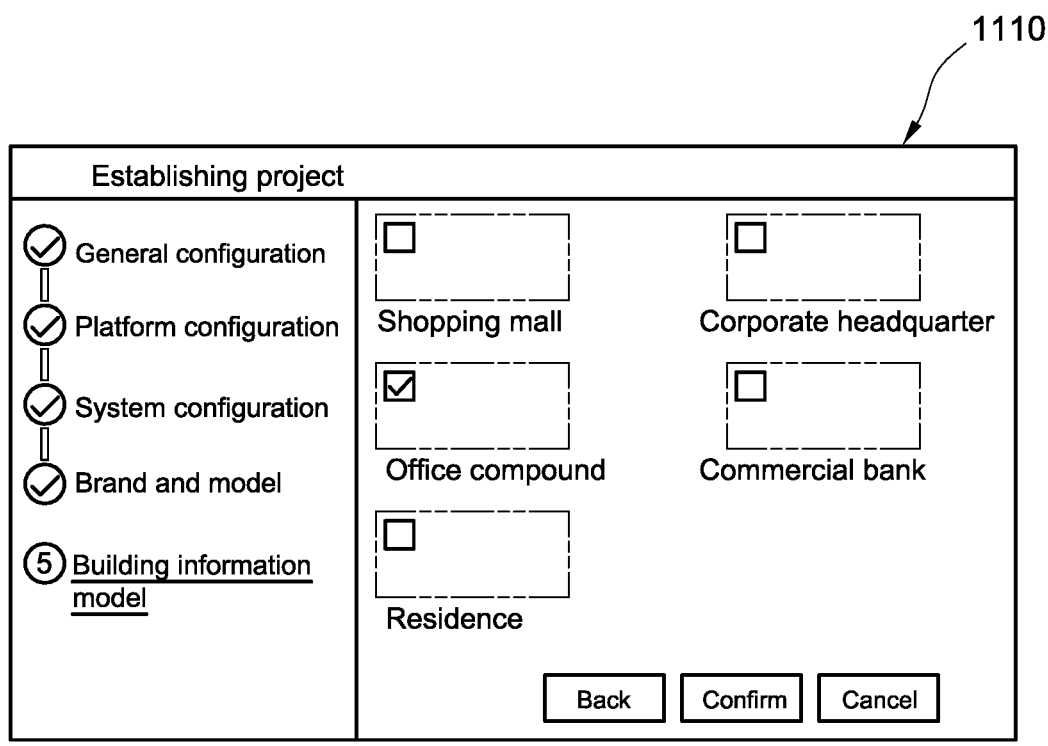
FIG. 4E is a schematic view of the project establishment page in the fifth embodiment of this disclosure.

Refer together with FIG. 3 to FIG. 4E, FIG. 3 is a flowchart of the cloud configuration in the first embodiment of this disclosure, FIG. 4A to FIG. 4E are the schematic views of the project establishment page in the first embodiment to the fifth embodiment of this disclosure. FIG. 3 shows the configuration procedure (i.e., the cloud configuration procedure) when the cloud management system 1 accepts the external operation from the manager by the cloud configuration platform 11 to establish an exclusive cloud configuration file F1 for a specific intelligent building system 2.

As shown in FIG. 3, the cloud configuration platform 11 accepts the external operation from the manager through the project management module 111 to establish a project, and configures the project data including a project name and a building name of at least one building in the project (step S10). Further, the project management module 111 adds the project data, such as configuring the MAC address of the intelligent building system 2 in charge of the building, based on the external operation (step S12), and the project management module 111 configures corresponding information of the multiple platforms, the multiple systems and the multiple equipment that need to be incorporated with the intelligent building system 2 according to the practical requirement of the building, and thus generates the cloud configuration file F1 used exclusively for the intelligent building system 2.

As shown in FIG. 4A, in some embodiments, when the manager needs to establish a project, the cloud configuration platform 11 provides a project establishment page 1110 correspondingly through the project management module 111 for the manager to input the project data. In some embodiments, the cloud configuration platform 11 sequentially includes multiple sub-procedures, such as a general configuration, a platform configuration, a system configuration, an equipment configuration (i.e., brand and model configuration) and a building information model (BIM) configuration with respect to the configuration procedure of one project. Further, the configurable contents of the lower-layer sub-procedure are differed by the configuration result of the upper-layer sub-procedure (described hereafter).

As shown in FIG. 4A, in the general configuration sub-procedure, the manager may input the project name of the project being established, the building name of one building in the project, the building location and the MAC address of the intelligent building system 2 managing the building on the project establishment page 1110. After the cloud configuration platform 11 newly establishes the cloud configuration file F1, the cloud configuration platform 11 may correlate the cloud configuration file F1 with the specific project, building and the intelligent building system 2 by the aforementioned data.

Refer back to FIG. 3, after the step S12, the project management module 111 displays a platform list through the project establishment page 1110 (step S14), and accepts the external operation from the manager to select the multiple platforms required by the building in the platform list (step S16).

As shown in FIG. 4B, in the platform configuration sub-procedure, the project management module 111 displays a platform list on the project establishment page 1110. The platform list records all of the platforms supported by the cloud management system 1, such as a building automation system (BAS), an energy management system (EMS), facility management system (FMS), etc., here is not intended to be limiting. In the step S16, the manager may select all or part of the platforms displayed on the platform list.

It should be noted that, as shown in FIG. 4B, the manager may choose to activate the BIM on the project establishment page 1110 or not. If the BIM is activated, the manager may perform the BIM configuration sub-procedure on the project establishment page 1110 subsequently (described hereafter).

Refer back to FIG. 3, after the step S16, the project management module 111 generates a system list according to one or multiple platforms being selected, and displays the system list through the project establishment page 1110 (step S18). Further, the project establishment page 1110 is configured to accept the external operation from the manager to select the multiple systems required by the building in the system list (step S20).

In some embodiments, the system list includes all of the supportive systems of one or multiple platforms selected in the step S16 by the manager. In other words, if the platform, such as the facility management system in the FIG. 4B, is not selected by the manager, the one or multiple systems under the platform are not displayed in the system list. Thus, the manager is unable to select the systems in the step S20. As a result, the configuration error from the manager may be prevented and the configuration time may be decreased effectively.

As shown in FIG. 4C, in the system configuration sub-procedure, the project management module 111 displays a system list on the project establishment page 1110. The system list records all of the supportive systems, such as a lighting system, a heating, ventilation, and air conditioning (HVAC) system, an elevator system, a plumbing system, an electricity system, a disaster prevention system, a cooling system, a shading system, a monitoring system, a parking lot system, etc., of the one or multiple platforms being selected in the platform configuration sub-procedure, here is not intended to be limiting. In the step S20, the manager may select all or part of the systems displayed on the system list to facilitate the performing of the remained configuration sub-procedures.

Refer back to FIG. 3, after the step S20, the project management module 111 generates an equipment list according to one or multiple systems being selected, and displays the equipment list through the project establishment page 1110 (step S22). Further, the project establishment page 1110 is configured to accept the external operation from the manager to select the multiple equipment required by the building in the equipment list (step S24). In some embodiments, the manager selects the brand and model of the multiple equipment required by the building in the equipment list.

It should be noted that the equipment list records all of the supportive equipment of the one or multiple systems being selected by the manager in the step S20. In other words, if the system, such as the elevator system, the plumbing system, etc., in the FIG. 4C, is not selected by the manager, one or multiple equipment under the system is not displayed in the equipment list. Thus, the manager is unable to select the equipment in the step S24. As a result, the configuration error from the manager may be prevented and the configuration time may be decreased effectively.

As shown in FIG. 4D, in the equipment configuration sub-procedure, the project management module 111 displays an equipment list on the project establishment page 1110. The equipment list records all of the supportive equipment of the one or multiple systems being selected in the system configuration sub-procedure. Specifically, the equipment list records the brands and models, such as Power_Meter_PM001, Power_Meter_EMA001, etc., in the FIG. 4D, of all of the equipment supported by the one or multiple systems being selected, here is not intended to be limiting. In the step S24, the manager may select all or part of the equipment displayed on the equipment list.

As described above, under the circumstance that the manager does not activate the BIM, the cloud configuration platform 11 may generate the cloud configuration file F1 exclusive to the intelligent building system 2 based on the accepted project name, building name, MAC address, multiple platforms being selected, multiple systems being selected and multiple equipment being selected.

Figure 5:
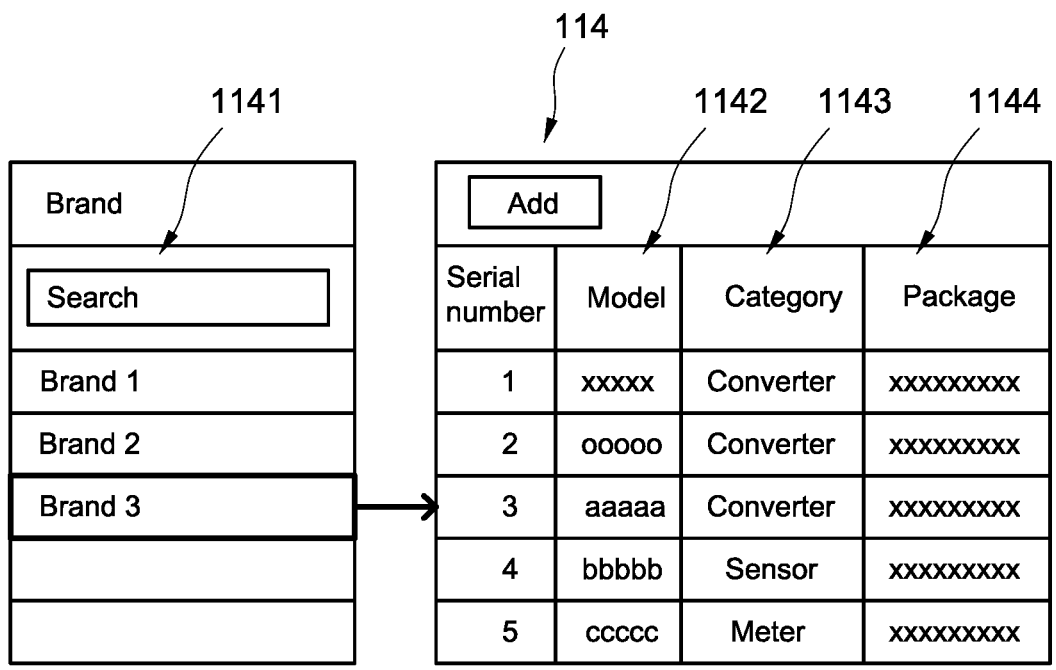
FIG. 5 is a schematic view of the equipment template infobase in the first embodiment of this disclosure.

Refer together with FIG. 5, which is a schematic view of the equipment template infobase in the first embodiment of this disclosure. The cloud configuration platform 11 of this disclosure further includes an equipment template infobase 114, and the cloud management system 1 records the data of a large amount of equipment through the equipment template infobase 114. Specifically, the manager may pre-collect and pre-establish the data, such as the brand 1141, the model 1142, the specification, the property, the control command, the communication interface and the data transmitting format, etc., of the known equipment that may be used in the building, and record the data of the equipment to the equipment template infobase 114.

It should be noted that apart from the known equipment, such as the equipment provided or/and manufactured by the same developer of the cloud management system 1, the intelligent building system 2 and the intelligent building kit 3, the equipment template infobase 114 may also accept the configuration from the manager of the data, such as the brand, the model, the specification, the property, the communication interface and the data transmitting format, etc., of one or multiple unknown equipment to collectively add the equipment data of the unknown equipment to the equipment template infobase 114.

In this disclosure, the equipment data of each equipment (including the known equipment and the unknown equipment) is recorded by using the flexible data structure, such as being recorded in a manner of using one data tag matching with one data content, to assemble the equipment template infobase 114. When the manager operates the cloud management system 1 through the graphical user interface (GUI) to establish the cloud configuration file F1, or operates the intelligent building system 2 to arrange one or multiple equipment 4 to each building, the manager may directly and repeatedly use the equipment data recorded in the equipment template infobase 114 without editing the equipment data of each equipment 4 for several times by the control codes. Further, the configuration threshold and arrangement time for the equipment 4 are fairly improved.

Refer back to FIG. 3, when the project management module 111 generates the cloud configuration file F1, the project management module 111 searches the equipment template infobase 114 based on the brands and models of multiple equipment selected by the manager in step S24 and reads the equipment data of the equipment from the equipment template infobase 114 to add to the cloud configuration file F1 directly. Therefore, when the manager configures the intelligent building system 2 (i.e., the ground configuration procedure), the manager does not need to edit the control codes for each equipment 4 arranged in the building. As a result, the arrangement difficulty of the equipment is lowered and the arrangement efficiency is increased.

It should be noted that if the manager activates the BIM in the cloud configuration procedure, after the step S24, the project management module 111 further obtains the BIM file of all of the buildings recorded in the cloud management system 1 from the BIM database 115, and displays the obtained BIM file through the project establishment page 1110 (step S26). Further, the project establishment page 1110 is configured to accept the external operation from the manager to select a BIM file corresponding to the building (step S28).

In some embodiments, the BIM file records the editable 3D image of the building. Specifically, all of the BIM files recorded in the BIM database 115 are being transformed, thereby the BIM files are capable of being opened directly through corresponding API for the manager to see the actual image of the building conveniently. Thus, the BIM file is convenient for the manager to arrange multiple equipment 4 to each region in the building in a visualized manner under the ground configuration procedure (described hereafter).

As shown in FIG. 4E, in the BIM configuration subprocedure, the project management module 111 displays all of the BIM files recorded in the BIM database 115 on the project establishment page 1110. In the step S28, the manager may select a specific BIM file corresponding to the target building on the project establishment page 1110 to add the BIM file to the generated cloud configuration file F1.

Refer back to FIG. 3, after the step S28, the cloud configuration platform 11 may generate the cloud configuration file F1 exclusive to the intelligent building system 2 based on the accepted project name, building name, MAC address, multiple platforms being selected, multiple systems being selected, multiple equipment being selected and BIM file being selected (step S30). After the step S30, the cloud management system 1 may export, online or offline, the cloud configuration file F1 to the intelligent building system 2 in charge of the target building (step S32) to make the intelligent building system 2 perform the ground configuration procedure based on the cloud configuration file F1.

It should be noted that under the circumstance of the manager activating the BIM, the cloud configuration file F1 may include one BIM file and the API corresponding to the BIM file at the same time. As a result, when the manager performs the ground configuration procedure to the intelligent building system 2 based on the cloud configuration file F1, the manager may directly open the BIM file by the API in the cloud configuration file F1 for facilitating the deployment of the multiple equipment 4 to the building in a visualized manner.

As mentioned above, the cloud configuration platform 11 further has a BIM management module 112. The BIM management module 112 is used to accept the uploading of one or multiple BIM files. In some embodiments, the BIM file may be the file edited by the software, such as Archi-CAD, TEKLA Structures, SketchUp, 3D Max, Magi CAD, Auto CAD, etc., and records the related 3D information of a building. One technical feature of this disclosure is that after the cloud configuration platform 11 accepts the uploading of one BIM file, the cloud configuration platform 11 performs the transformation procedure to the BIM file and then adds the transformed BIM file to the building information model database 115.

As mentioned above, the BIM files recorded in the building information model database 115 are transformed to the file with specific format through the transformation procedure. Therefore, when the manager performs the cloud configuration procedure to the cloud management system 1, the manager may directly open the BIM file through the project management module 111 to see the 3D information of the building. When the manager performs the ground configuration procedure to the intelligent building system 2, the manager may directly open the BIM file in the cloud configuration file F1 through the API in the cloud configuration file F1 to arrange multiple equipment 4 to the building.

As shown in FIG. 5, the equipment template infobase 114 is used to store the equipment data of all of the equipment 4 that may be used for the building. In some embodiments, the equipment data at least includes the brand 1141 and the model 1142 of the equipment, and may further include a category tag 1143 and a package tag 1144 of the equipment 4. In some embodiments, the category tag 1143 records the equipment category of the equipment, such as a converter, a controller, a sensor, etc., and the package tag 1144 records at least one of the information, such as the specification, property, control command, communication interface, data transmitting format, etc., here is not intended to be limiting. In the step S22 in FIG. 3, the project management module 111 searches the equipment template infobase 114 and determines whether each equipment 4 is a supportive equipment for one or multiple systems being selected according to the equipment category.

As shown in FIG. 2, the cloud configuration platform 11 further includes an equipment management module 113. The equipment management module 113 is used to accept the external operation from the manager for inputting the equipment data of a new equipment, and add the equipment data to the equipment template infobase 114 for adding the new equipment (a known equipment or an unknown equipment) to the equipment template infobase 114. As a result, when the manager configures one building through the project establishment page 1110, the manager may add the new equipment to corresponding cloud configuration file F1 based on renewed equipment template infobase 114.

Refer together with FIG. 6, which is a schematic view of the equipment configuration page in the first embodiment of this disclosure. One technical feature of this disclosure is that cloud management system 1 regulates the standard communication protocol and respectively provides corresponding configuration page to each communication protocol by the equipment management module 113. As shown in FIG. 6, the equipment management module 113 provides an equipment configuration page 1130 specifically to a communication protocol 1131.

In some embodiments, the equipment management module 113 is configured to accept the external operation from the manager through the equipment configuration page 1130 for inputting the fundamental parameters of new equipment.

In some embodiments, the equipment management module 113 transforms the fundamental parameters to the programming codes of communication protocol, such as Modbus in FIG. 6, corresponding to the equipment configuration page 1130 after the manager completing the inputting, and stores the transformed programming codes to the equipment template infobase 114 for finishing the adding operation of the new equipment.

The manager only needs to use the communication document provided by the equipment developer, open the equipment configuration page 1130 correspondingly according to required communication protocol, and input corresponding fundamental parameters to corresponding field according to the instruction. The fundamental parameters are transformed automatically to required programming codes during configuration by the system through the transformation function of the equipment configuration page 1130. As a result, the manager may conveniently add the new equipment to the equipment template infobase 114 without inputting or editing the programming codes.

This disclosure elevates the configuration of equipment (particularly the configuration of communication protocol) to the cloud layer and stores that in an infobase manner. Therefore, the creator, such as the manager, of the project/building only needs to perform the configuration to the equipment (including the known equipment and the unknown equipment) one time and may use configured equipment data repeatedly in different cases. Further, when the number of the managers is multiple, the cloud management system 1 also supports multi-users remote configuration. Therefore, entire establishing time of the intelligent building is decreased.

In some embodiments, the cloud management system 1 may incorporate one or multiple equipment 4 of high usability into the preset automatically, and notify the update message to the system integrator (not shown in figures) in specified time. In some embodiments, the system integrator may decide to add the new communication protocol or not, or to update the existing communication protocol. Thus, the object of resource sharing is achieved.

Figure 7:
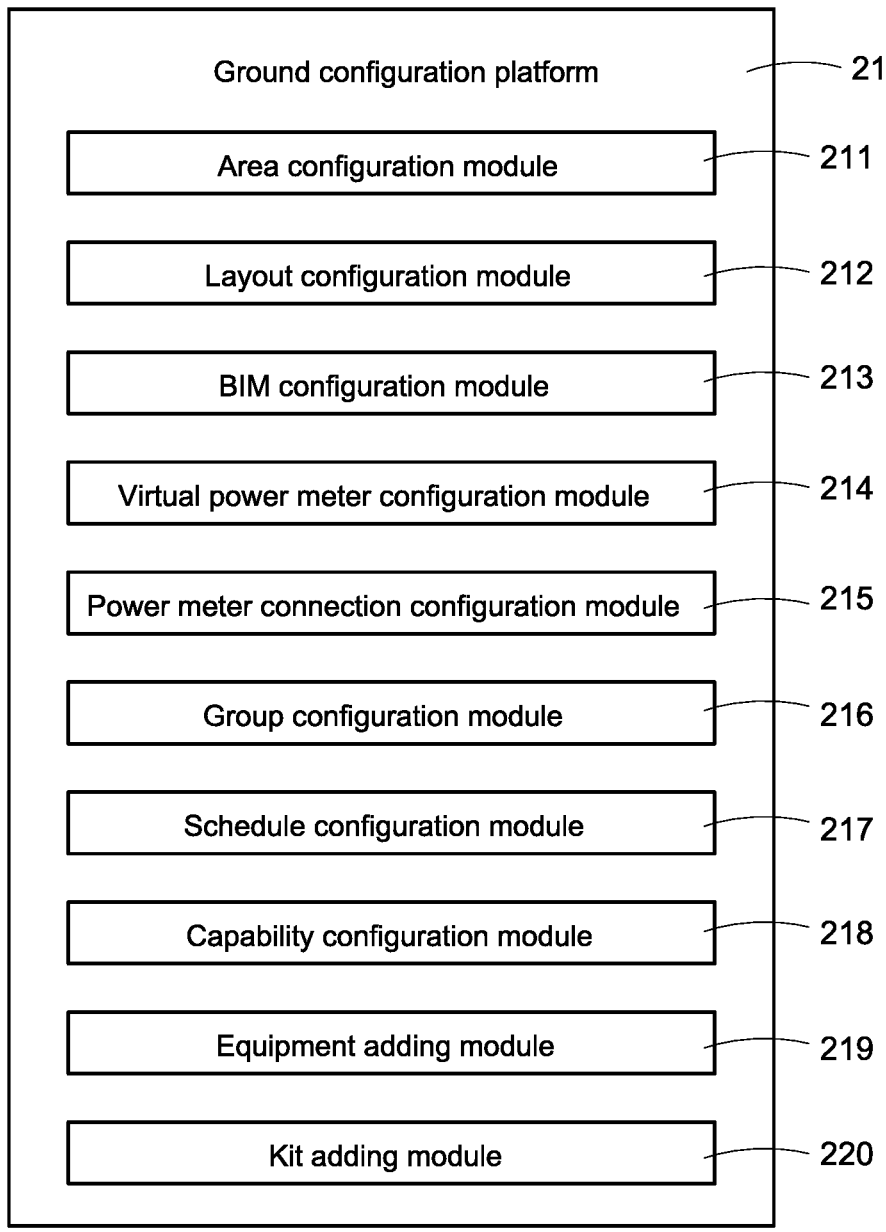
FIG. 7 is a block diagram of the ground configuration platform in the first embodiment of this disclosure.

Refer to FIG. 7, which is a block diagram of the ground configuration platform in the first embodiment of this disclosure. As shown in FIG. 7, the ground configuration platform 21 at least has an area configuration module 211, a layout configuration module 212 and a BIM configuration module 213. Specifically, the ground configuration platform 21 may be implemented in a software manner in the intelligent building system 2 and provides the manager to perform required page of the ground configuration procedure based on the imported cloud configuration file F1. The intelligent building system 2 logically divides the ground configuration platform 21 into multiple modules based on the functions that the ground configuration platform 21 is capable of achieving. In other words, the area configuration module 211, the layout configuration module 212 and the BIM configuration module 213 belong to the programmable software module.

In this disclosure, the area configuration module 211 is used for the managers to define multiple planar regions by themselves. Specifically, the intelligent building system in related art, which is often restricted by the graphic control software used, can only perform the deployment of equipment with the basic unit of floor of the building. However, the building types are getting more and more complicated, and the method of merely using floor as the basic unit for deployment may not be applicable, for example in the case with the factory or industrial park occupying large area without any floor. In this disclosure, the area configuration module 211 provides the manager to use the area, such as the building, the floor, the space, etc., as the unit to define required multiple planar regions by himself.

For examples, depending on the practical requirement of the building, the manager may define first to tenth floors as one area, define west side as one area, define building A as one area, or define the corridor as one area without being confined by the originally planned floors of the building. Thus, the deployment of the equipment is more flexible comparing to the related art.

The layout configuration module 212 provides the manager to configure the location coordinates of the multiple equipment 4 recorded in the cloud configuration file F1, thereby each equipment 4 is deployed respectively to each defined planar region. The manager may directly configure the control panel of each equipment 4 in each planar region through the usage of the layout configuration module 212. Therefore, when the user connects the Internet front-end 51 or the cell phone front-end 52 of the intelligent building system 2 though the Internet, the user may directly inspect each planar region on the front-end page and directly open the control panel in each planar region to inspect the real-time information of each equipment 4 and perform remote control to each equipment 4.

Figure 8B:
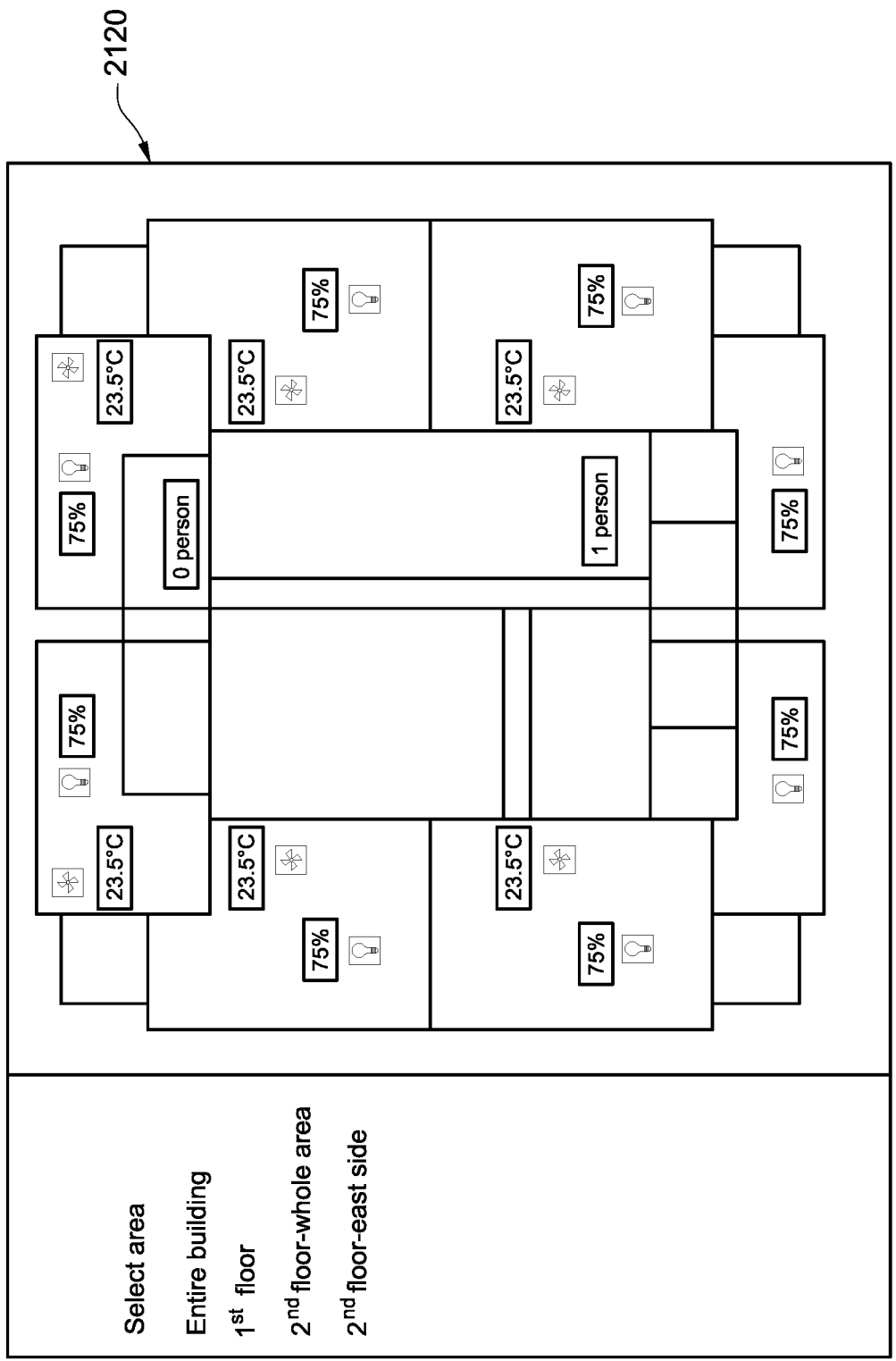
FIG. 8B is a schematic view of the layout configuration in the first embodiment of this disclosure.

Refer together with FIG. 8A and FIG. 8B, FIG. 8A is a schematic view of the area configuration in the first embodiment of this disclosure and FIG. 8B is a schematic view of the layout configuration in the first embodiment of this disclosure. As shown in FIG. 8A, when the manager performs the ground configuration procedure to the intelligent building system 2, the ground configuration platform 21 provides an area configuration page 2110 through the area configuration module 211. On the area configuration page 2110, the manager may define multiple planar regions by himself, such as first floor, second floor whole area, second floor east side, etc., as shown in FIG. 8A, and define the size of each planar region.

As shown in FIG. 8A, on the area configuration page 2110, the manager may obtain the equipment data of the multiple equipment 4 deployable for the building from contents of the cloud configuration file F1 and respectively correspond each equipment 4 to each defined planar region, such as configuring name of the equipment 4 for relating the equipment 4 with the planar region being deployed.

As shown in FIG. 8B, the ground configuration platform 21 further provides a layout configuration page 2120 through the layout configuration module 212. In some embodiments, the ground configuration platform 21 may list all of the planar regions defined by the manager, such as the description on the left side of FIG. 8B, on the layout configuration page 2120. In some embodiments, the manager may configure the location coordinate of each equipment 4 recorded in the cloud configuration file F1 to respectively deploy each equipment 4 to corresponding planar region. Thus, the equipment layout is completed.

Moreover, as shown in FIG. 8B, the ground configuration platform 21 may directly display the real-time status, such as 75%, 23.5° C., one person, etc., in FIG. 8B, of the equipment 4 in each planar region on the front-end page of the intelligent building system 2.

After the manager finishes the layout of the planar region and the equipment, the user may acquire friendly and readable information (as shown in FIG. 8B) through the Internet front-end 51 or the cell phone front-end 52. On the other hand, the user may require the displaying manner to be more immersive.

Figure 8C:
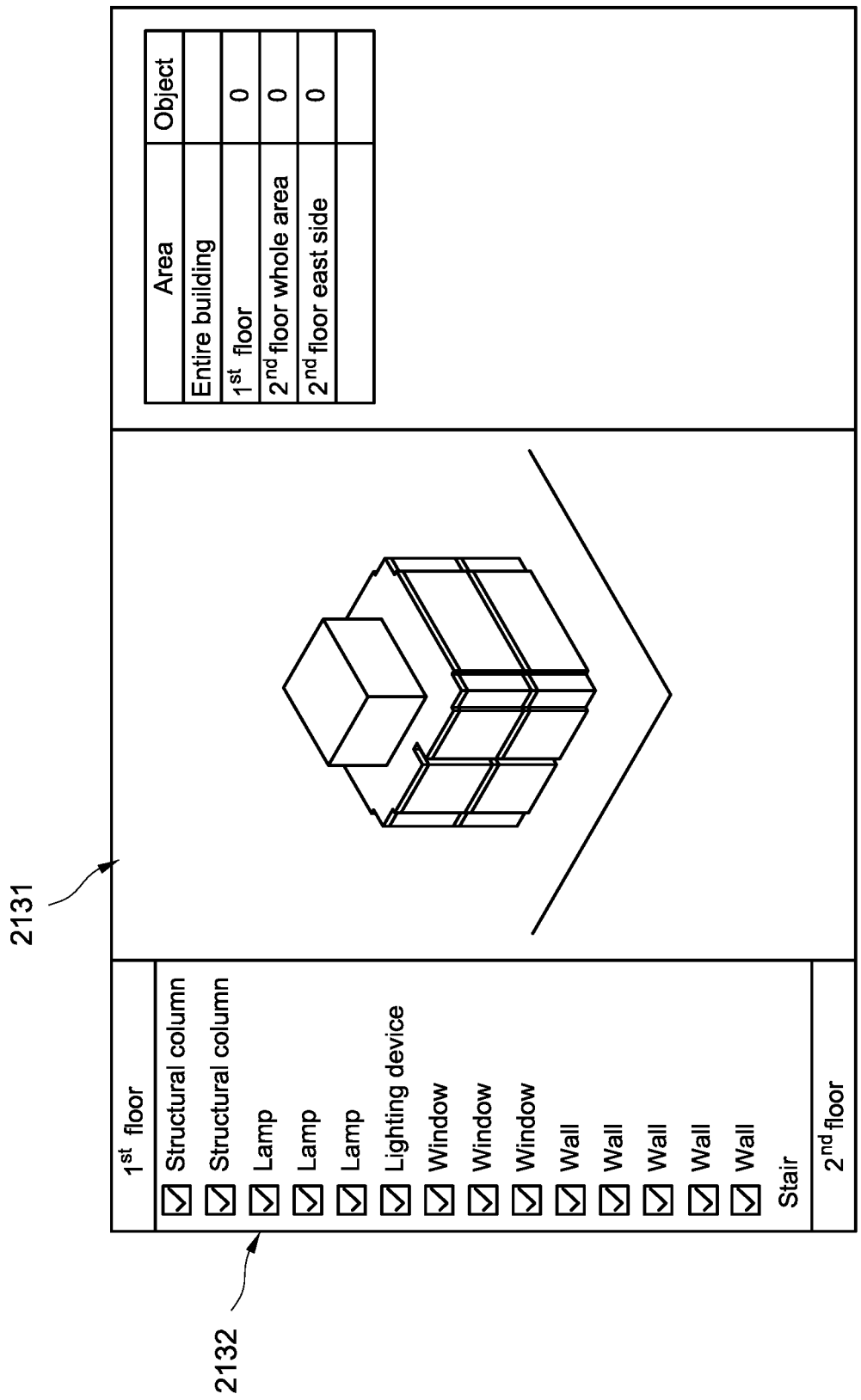
FIG. 8C is a schematic view of the layout configuration in the second embodiment of this disclosure.
Figure 8D:
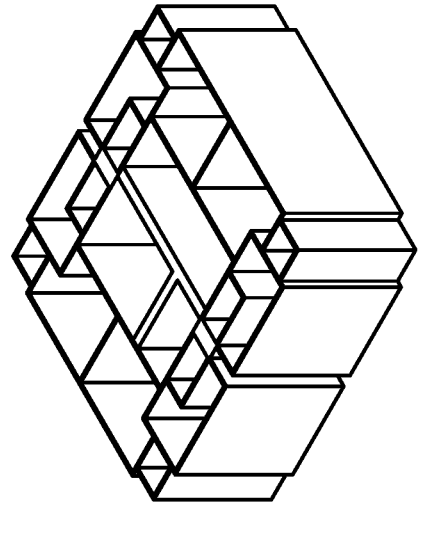
FIG. 8D is a schematic view of the layout configuration in the third embodiment of this disclosure.

Refer together with FIG. 8C and FIG. 8D, FIG. 8C and FIG. 8D are the schematic view of the layout configuration in the second embodiment and the third embodiment of this disclosure respectively.

As shown in FIG. 8C and FIG. 8D, the BIM configuration module 213 is used to read the BIM file in the cloud configuration file F1 and open the 3D image 2131 of the building recorded in the BIM file. Further, the BIM configuration module 213 provides the manager to respectively correspond multiple objects 2132 included in the 3D image 2131 to each configured planar region 2133, each system and each equipment 4. As a result, the intelligent building system 2 may provide 3D appearance through the front-end page, thereby the interaction between the intelligent building system 2 and the user is more intuitive comparing to previous embodiment.

Specifically, the BIM configuration module 213 is configured to use the API in the cloud configuration file F1 to open the BIM file for obtaining all of the objects 2132, such as structural column, lamp, light device, electric equipment, window, bonsai, stair, wall, etc., included in the 3D image 2131 recorded in the BIM file, here is not intended to be limiting. In some embodiments, the BIM configuration module 213 may provide corresponding configuration page to display the 3D image 2131. Further, the BIM configuration module 213 displays the accepting of the operation from the manager through the configuration page to select feasible object 2132 and corresponds the selected object 2132 to configured planar region 2133.

For examples, the manager may select the objects 2132, such as column, wall, lamp, and window, etc., of one room in the 3D image 2131, and link the objects 2132 with manager-defined planar region 2133, such as second floor east side office. As a result, the intelligent building system 2 may extrude (provide stereo-image effect to) the information displayed on the front-end page for the user to inspect and control conveniently and remotely.

It should be noted that the 3D image 2131 of the building may include multiple objects 2132 and the manager may miss the configuration for some of those. Therefore, after the manager finished the linkage operation to the objects 2132, the BIM configuration module 213 may execute a check procedure automatically. The check procedure is configured to scan all of the objects in the 3D image 2131, and find out one or multiple objects 2132 non-linkage to any planar region 2133, and send out alarm through the configuration page to prevent the configuration from the missing.

Moreover, the check procedure is configured to further scan all of objects 2132, planar regions 2133, systems and equipment being linked, and determine whether deployment conflict (such as the same object being corresponded to two separate planar regions 2133 at the same time) occurs. When the deployment conflict occurs, the BIM configuration module 213 sends out alarm through the configuration page to prevent the configuration from error.

As shown in FIG. 7, the ground configuration platform 21 may further include a virtual power meter configuration module 214. Similarly, the virtual power meter configuration module 214 may be implemented in a software manner in the ground configuration platform 21.

Specifically, multiple physical power meters (not shown in figures) may be deployed in a building but the electricity consumption displayed by each physical power meter may not meet the managing requirement of the manager. One technical feature of this disclosure is that the ground configuration platform 21 permits the manager to per se define one or multiple virtual power meters and make the recorded content of the virtual power meter fulfill the practical requirement of the manager.

Specifically, the virtual power meter configuration module 214 provides the manager to select multiple power meters in the building and the generating manner of the virtual power meter simultaneously. Thus, a virtual power meter is generated based on the electricity consumption indicated by the multiple power meters being selected. In some embodiments, the generating manner of the virtual power meter may include a plus type, a minus type and a split type, etc., here is not intended to be limiting.

Figure 9A:
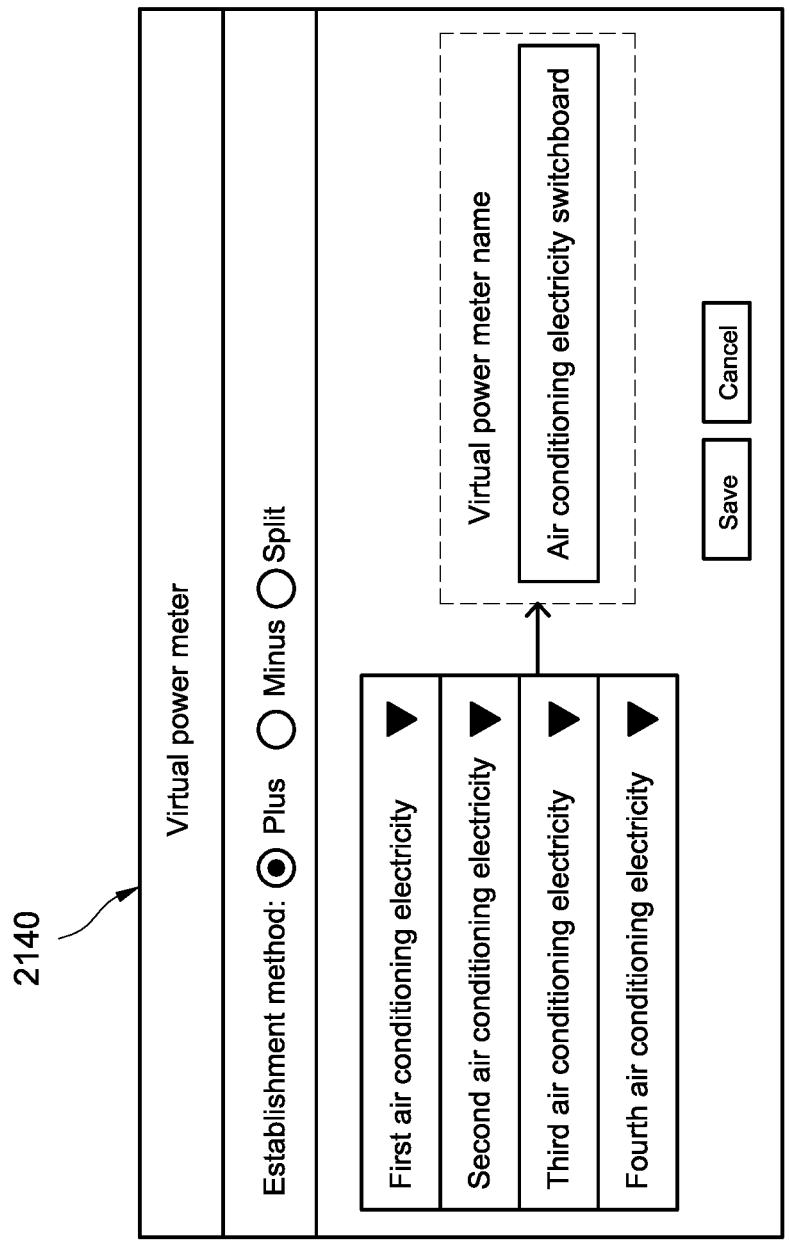
FIG. 9A is a schematic view of the virtual power meter in the first embodiment of this disclosure.
Figure 9B:
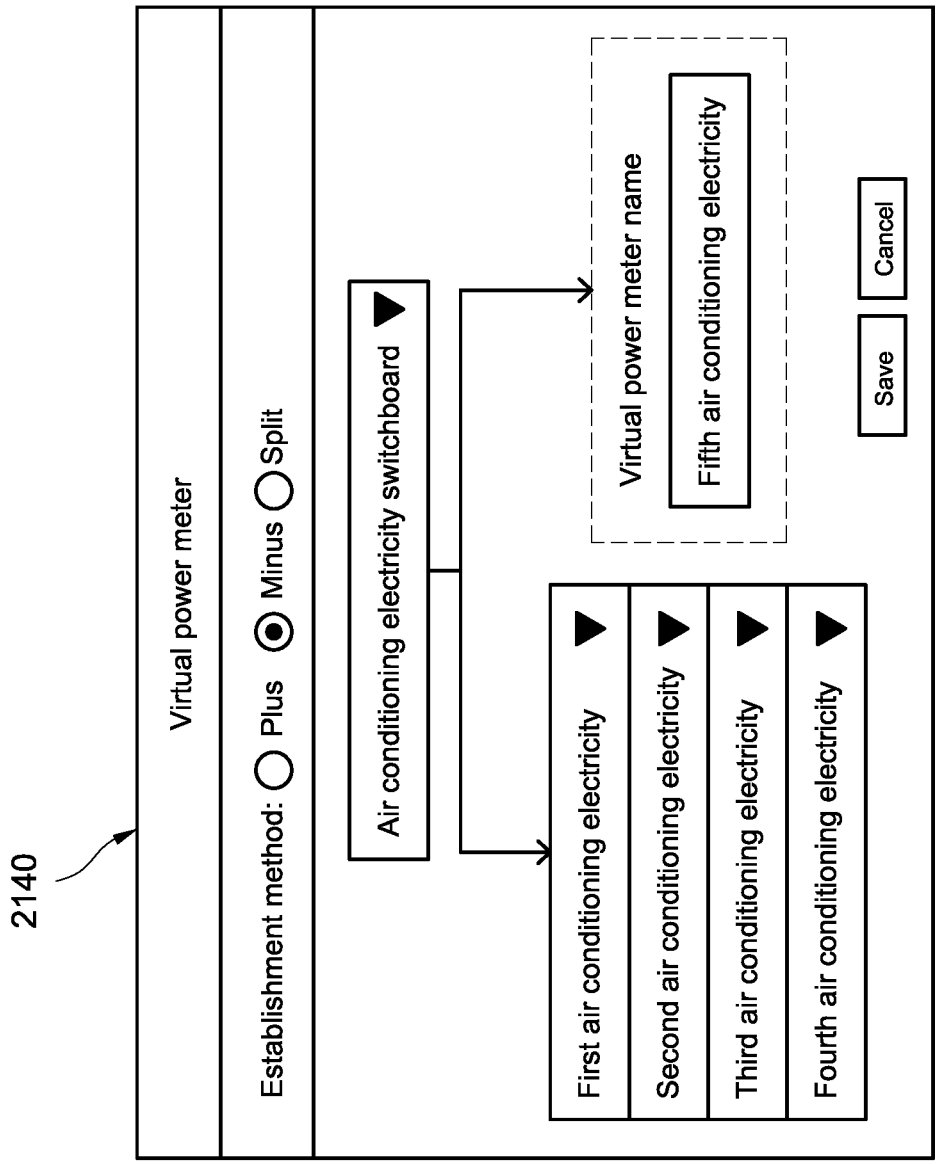
FIG. 9B is a schematic view of the virtual power meter in the second embodiment of this disclosure.
Figure 9C:
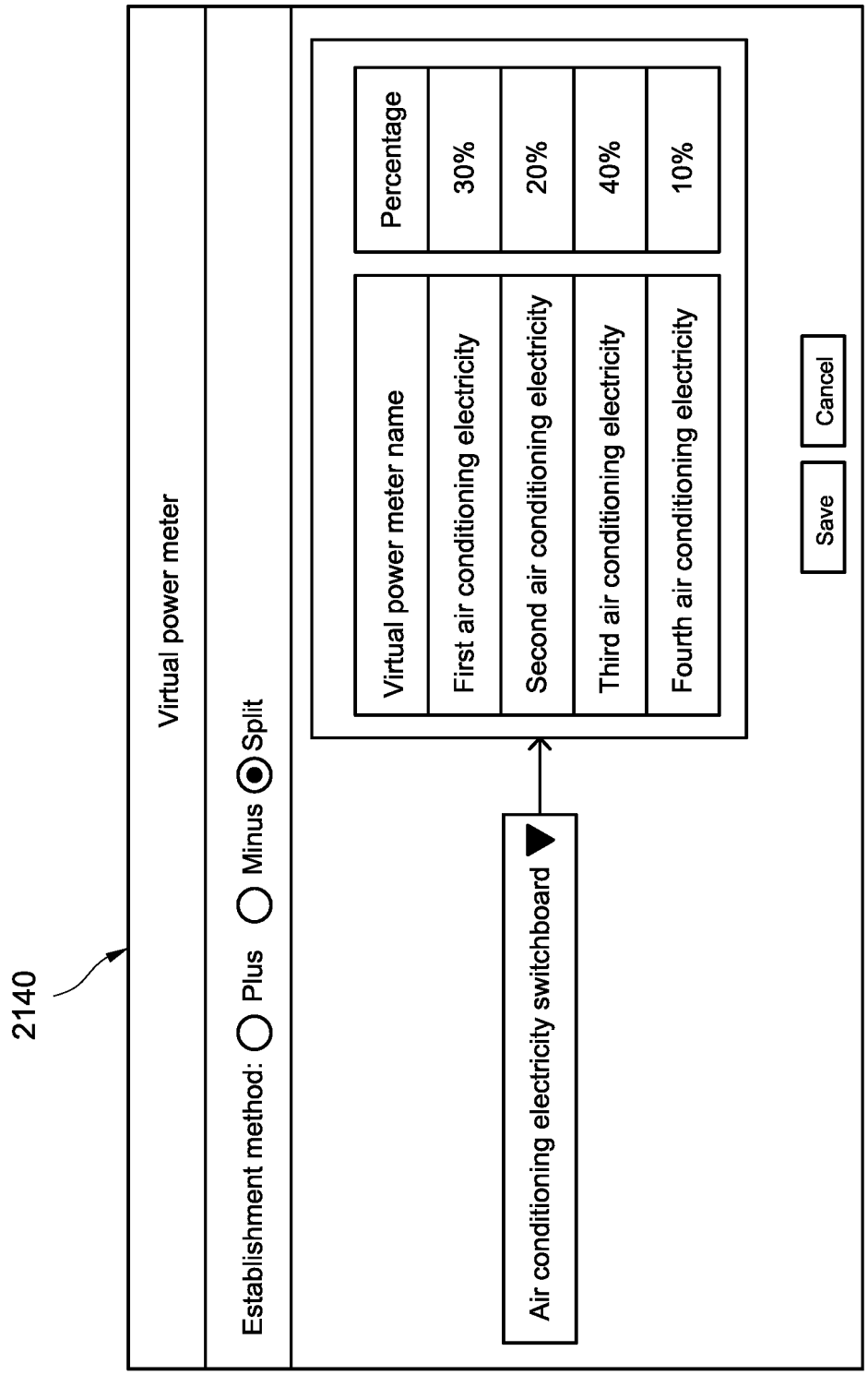
FIG. 9C is a schematic view of the virtual power meter in the third embodiment of this disclosure.

Refer together with FIG. 9A to FIG. 9C, which are the schematic view of the virtual power meter in the first embodiment to the third embodiment of this disclosure respectively.

As shown in FIG. 9A, the virtual power meter configuration module 214 provides a virtual power meter configuration page 2140. The manager may select the generating manner of the virtual power meter on the virtual power meter configuration page 2140. Under the circumstance of the manager selecting the plus type, the manager may further select multiple power meters (including the physical power meter and the generated virtual power meter), and the virtual power meter configuration module 214 generates a virtual power meter based on all of the power meters being selected. In some embodiments, generated virtual power meter displays the electricity consumption summation of all of the power meters being selected. In the embodiment of FIG. 9A, a virtual power meter named "air conditioning electricity switchboard" is generated, and the virtual power meter is made to include four power meters of "air conditioning electricity".

In the embodiment of FIG. 9B, the manager selects the minus type on the virtual power meter configuration page 2140. In some embodiments, the manager may select a main power meter and further select multiple sub-power meters for deduction, thereby a virtual power meter is generated. In some embodiments, the virtual power meter generated by the virtual power meter configuration module 214 displays the remained electricity consumption calculated by subtracting values of the multiple sub-power meters from that of the main power meter. In the embodiment of FIG. 9B, a virtual power meter named "fifth air conditioning electricity" is generated, and content of the virtual power meter is subtracting the electricity consumption displayed on four selected "air conditioning electricity" from the electricity consumption displayed on the "air conditioning electricity switchboard".

In the embodiment of FIG. 9C, the manager selects the split type on the virtual power meter configuration page 2140. In some embodiments, the manager may select a main power meter, and configure multiple virtual power meters and the percentage (summation of the percentages of all virtual power meters must be equal to 100%) of each virtual power meter simultaneously. In some embodiments, content of each virtual power meter generated by the virtual power meter configuration module 214 is the multiplication of the electricity consumption displayed on the main power meter and configured percentage respectively. In the embodiment of FIG. 9C, four virtual power meters named "air conditioning electricity" are generated, and content of each virtual power meter is the multiplication of the electricity consumption displayed on the "air conditioning electricity switchboard" and configured percentage respectively.

With the usage of the virtual power meter configuration module 214, the intelligent building system 2 permits the manager to define multiple virtual power meters voluntarily to facilitate observation and analysis of the electricity consumption of the equipment of every category in the building without the limitation of the appearance of the power meter practically installed in the building.

As shown in FIG. 7, the ground configuration platform 21 may further include a power meter connection configuration module 215. Similarly, the power meter connection configuration module 215 may be implemented in a software manner in the ground configuration platform 21. Specifically, the power meter connection configuration module 215 provides the manager to connect the multiple power meters (including physical power meter and virtual power meter) in the building in a tree structure manner, thereby the energy flow diagram of the building is established. As a result, the manger may clearly comprehend energy consumption condition of the building through the energy flow diagram and find out the critical bottleneck for executing energy-saving improvement.

Figure 9D:
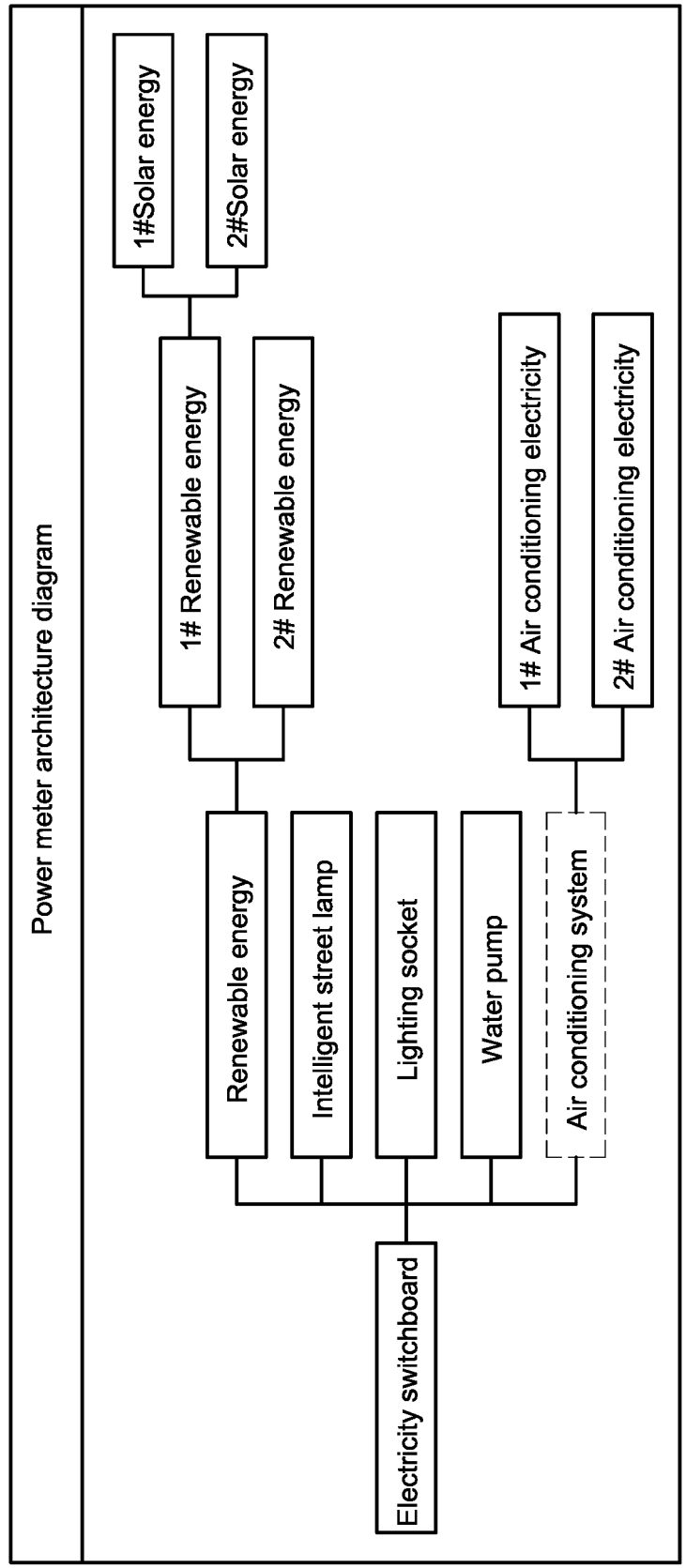
FIG. 9D is an architecture diagram of the power meter in the first embodiment of this disclosure.

Refer together with FIG. 9D, which is an architecture diagram of the power meter in the first embodiment of this disclosure. As shown in FIG. 9D, the power meter connection configuration module 215 may provide a configuration page. The manager may edit multiple required power meters (including physical power meter and virtual power meter) on the configuration page to form a power meter architecture diagram 2150. The same power meter may exist in multiple power meter architecture diagrams 2150 at the same time, but the power meters in one power meter architecture diagram 2150 are not allowed to be repeated.

With the establishment of the power meter architecture diagram 2150, the manager may clearly comprehend energy flow of the building, and find out the cause of influencing the electricity consumption immediately when the electricity consumption is higher than normal condition.

As shown in FIG. 7, the ground configuration platform 21 may further include a group configuration module 216. Similarly, the group configuration module 216 may be implemented in a software manner in the ground configuration platform 21. In some embodiments, the manager may connect the Internet front-end 51 or the cell phone front-end 52 of the intelligent building system 2 through computer or portable equipment, and control each equipment 4 in the building independently. The operation of controlling each equipment 4 one by one may be time-consuming and tedious, thereby the intelligent building system 2 further provides the function of grouped control through the group configuration module 216.

Specifically, the group configuration module 216 provides corresponding configuration page (not shown in figures), the manager may assemble multiple equipment 4 with the same brand and/or model to a group on the configuration page. As a result, when the manger performs the operation of control, the intelligent building system 2 is permitted to release a grouped control command to a group. Therefore, the multiple equipment 4 in the same group are controlled simultaneously for facilitating the operation of controlling multiple equipment.

The multiple equipment with the same brand and/or model may have the same or similar specification, property, communication interface and data transmitting format. Therefore, in some embodiments, the group configuration module 216 provides the manager to assemble multiple equipment 4 with the same brand and/or model to a group. For example, the manager may collectively configure all of the lights that belong to model B of brand A to the same group. As a result, even the lights are distributed on different floors, regions, or buildings, the intelligent building system 2 still permits the manager to turn off/turn on all of the lights in the same group with single command at the same time.

As shown in FIG. 7, the ground configuration platform 21 may further include a schedule configuration module 217. Similarly, the schedule configuration module 217 may be implemented in a software manner in the ground configuration platform 21. The schedule configuration module 217 provides corresponding configuration page (not shown in figures), and the manager may configure the schedule of each equipment 4 in the building on the configuration page. After the schedule is configured, each equipment 4 may be operated according determined schedule, such as automatically turning on all lights on working hours from eight o'clock a.m. to five o'clock p.m. and automatically turning off all light on off-work hours from five o'clock p.m. to eight o'clock a.m.

In some embodiments, the schedule configuration module 217 further includes a conflict check unit (not shown in figures). The conflict check unit is used to execute conflict check operation to the schedule of each equipment 4 when the manager configures the schedule. In some embodiments, the conflict check operation is used to confirm that each equipment 4 only execute one operation at the very time point, and to send out the alarm signal, such as sending out the alarm signal through the Internet front-end 51 or the cell phone front-end 52 of the intelligent building system 2, when any schedule of any equipment 4 is conflicted.

In the first embodiment, the conflict check unit executes the conflict check operation when the manager configures the schedule of each equipment 4, and sends out the alarm signal when the conflict occurs in the schedule. In the second embodiment, the conflict check unit executes the conflict check operation during the ground configuration platform 21 deploying the schedule of each equipment 4 to a perpetual calendar, and sends out the alarm signal when the conflict occurs in the schedule. In the third embodiment, the conflict check unit executes the conflict check operation when any schedule of any equipment 4 is deactivated first and then re-activated, and sends out the alarm signal when the conflict occurs in the schedule. Here is not intended to be limiting.

It should be noted that when the conflict occurs in the schedule of any equipment 4, apart from sending out the alarm signal, the intelligent building system 2 may acquire historical data of the building from the ground database (not shown in figures) and automatically provide proper suggested schedule after analyzation. Therefore, when the manager adjusts the schedule of each equipment 4, the manager may have better judgement and management by considering the suggestion from the intelligent building system 2.

As described above, the intelligent building system 2 of this disclosure communicates with one or multiple intelligent building kits 3, and each intelligent building kit 3 connects the equipment 4 of specific category in the building respectively. Further, each intelligent building kit 3 is configured to be a specific kit category priorly when being developed based on the equipment category of the equipment 4 that needs to be connected. Each intelligent building kit 3 is built in with corresponding intelligent computing analytical capability respectively based on different kit categories.

For examples, the first intelligent building kit is used to connect electricity-related equipment during practical deployment, thereby the first intelligent building kit is configured to be electricity category and the first intelligent building kit is built in with the intelligent computing analytical capability for analyzing electricity consumption. The second intelligent building kit is used to connect lights during practical deployment, thereby the second intelligent building kit is configured to be light category and the second intelligent building kit is built in with the intelligent computing analytical capability for statistically analyzing usage time of the lights. Here is not intended to be limiting.

As shown in FIG. 7, the ground configuration platform 21 may further include a capability configuration module 218. Similarly, the capability configuration module 218 may be implemented in a software manner in the ground configuration platform 21. In some embodiments, when the intelligent building kit 3 establishes the communication (including wired connection and wireless connection) with the intelligent building system 2, the intelligent building kit 3 may automatically report the IP address at the very time and the kit category thereof to the intelligent building system 2.

One technical feature of this disclosure is that the cloud configuration file F1 accepted by the intelligent building system 2 records the kit categories and the intelligent computing analytical capabilities of all of the intelligent building kits 3 that need to be connected to the intelligent building system 2. After the report from one of the intelligent building kits 3 is accepted, the intelligent building system 2 determines whether the cloud configuration file F1 records the kit category of the intelligent building kit 3.

As described above, one of the intelligent building kits 3 is used to connect the equipment with specific equipment category and has corresponding kit category based on the equipment category. Therefore, when the manager selects the equipment with the specific equipment category in the equipment configuration sub-procedure of the cloud configuration procedure, the project management module 111 records the equipment and corresponding kit category in the cloud configuration file F1 simultaneously.

If the ground configuration platform 21 determines that imported cloud configuration file F1 records the kit category of the intelligent building kit 3, the ground configuration platform 21 activates corresponding capability configuration module 218, such as providing an operable configuration page, and permits the manager to perform detailed configuration, such as configuring obtaining time to the equipment parameter, specific execution method and execution content of the intelligent computing analytical capability, etc., to the intelligent building kit 3 through the capability configuration module 218.

If the ground configuration platform 21 determines that imported cloud configuration file F1 does not record the kit category of the intelligent building kit 3, it may indicate that the intelligent building kit 3 is being used erroneously. Therefore, the intelligent building system 2 does not activate the capability configuration module 218. On the other hand, the intelligent building system 2 may modify the kit category, such as modifying to mix category, of the intelligent building kit 3 and forbid usage of the intelligent computing analytical capability of the intelligent building kit 3.

It should be noted that the intelligent building kit 3 may further include a computing unit (not shown in figures). The computing unit performs computation to obtained equipment parameter through the intelligent computing analytical capability and uploads computed data to the intelligent building system 2. Therefore, the integrated intelligent building management system of this disclosure may identify the intelligent building kit 3 as an edge computing module to share computing loading of the processors in the intelligent building system 2 and increase the speed of data processing.

One technical feature of this disclosure is that when the manager performs the ground configuration procedure to the intelligent building system 2, the operation is confined by contents of imported cloud configuration file F1 and may merely perform limited configuration operation. For examples, the area configuration module 211 and the layout configuration module 212 only permit the manager to deploy the multiple equipment 4 in the cloud configuration file F1 to defined planar region. If the equipment 4 is not existent in the cloud configuration file F1, the intelligent building system 2 does not permit the manager to correspond the equipment 4 with the building.

For other examples, the capability configuration module 218 permits the manager to perform detailed configuration to the intelligent building kit 3 only when the kit category of the intelligent building kit 3 communicated with the intelligent building system 2 is existent in the cloud configuration file F1. If the kit category of the intelligent building kit 3 is not supported by the cloud configuration file F1, the intelligent building system 2 does not permit the manager to configure the intelligent building kit 3 and does not permit the intelligent building kit 3 to execute predetermined intelligent computing analytical capability.

In some specific conditions, the manager may still have requirement of deploying the equipment 4 non-existent in the cloud configuration file F1 to the building. One technical feature of this disclosure is that the integrated intelligent building management system still provides the manager with the extension function of directly adding the equipment data of required equipment 4 on the ground (i.e., with respect to the intelligent building system 2).

Figure 10:
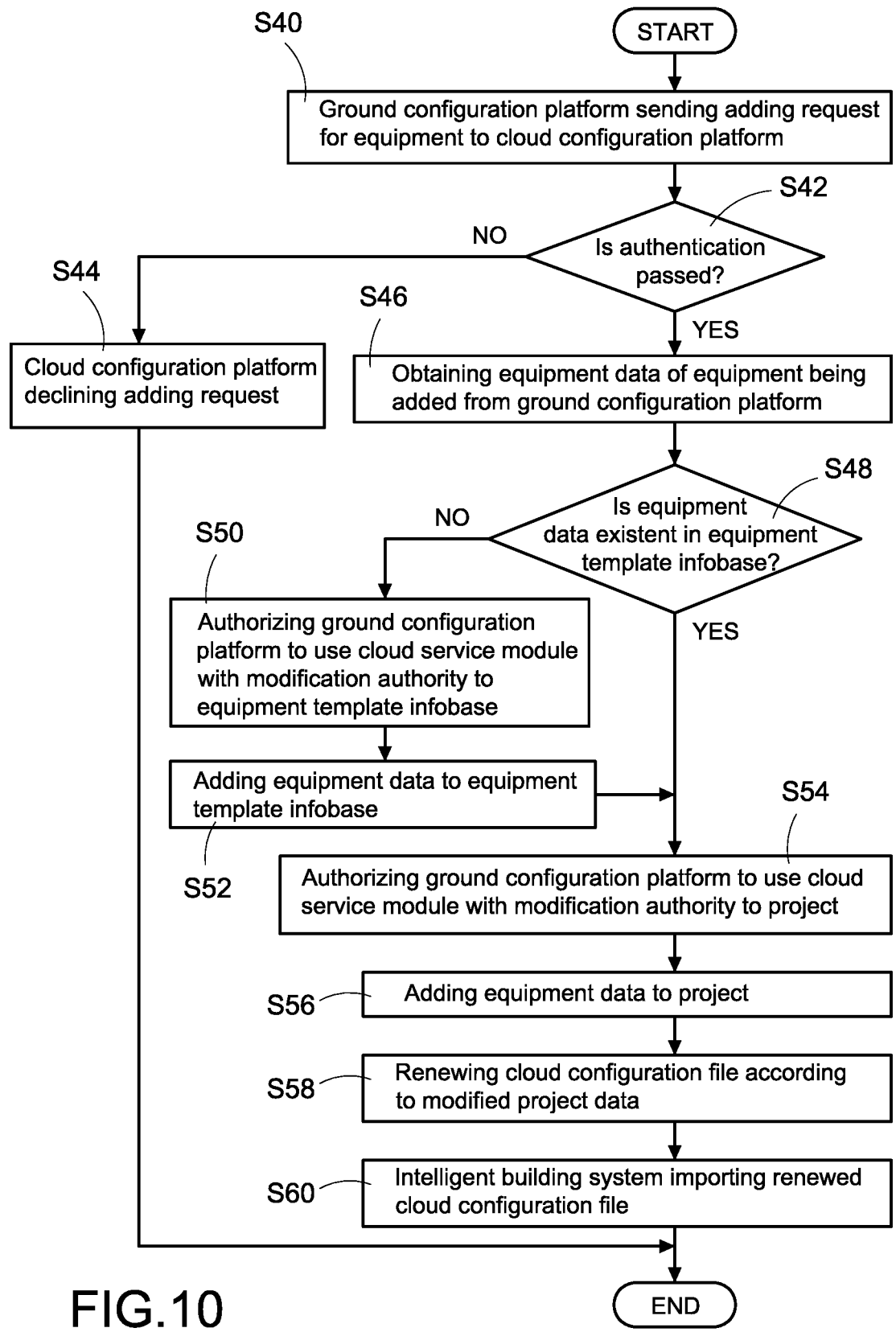
FIG. 10 is a ground adding flowchart in the first embodiment of this disclosure.

Refer together with FIG. 10, which is a ground adding flowchart in the first embodiment of this disclosure. As shown in FIG. 7, the ground configuration platform 21 may further include an equipment adding module 219. Similarly, the equipment adding module 219 may be implemented in a software manner in the ground configuration platform 21. When the manager executes the ground configuration procedure to the intelligent building system 2, if the manager has requirement of adding the equipment 4, the ground configuration platform 21 may execute the operations shown in FIG. 10 through the equipment adding module 219 to assist the manager to perform the adding operation of the equipment 4 from the ground.

As shown in FIG. 10, when the manager needs to add the equipment 4, the manager may send out command to the intelligent building system 2 through the specific interface (not shown in figures), and the intelligent building system 2 is triggered by the command and may send out the adding request for the equipment 4 to the cloud configuration platform 11 through the ground configuration platform 21 (step S40). When the cloud configuration platform 11 accepts the adding request, the cloud configuration platform 11 performs the authentication operation of the authorization certificate to the ground configuration platform 21 (step S42), and when the authentication operation fails the cloud configuration platform 11 sends out response of declining the request to the ground configuration platform 21 (step S44).

In some embodiments, the authorization certificate may be entrained in the adding request. When the cloud configuration platform 11 determines that the authorization certificate is non-existent in the adding request or the authorization certificate indicates that the intelligent building system 2 has no authority to add the equipment 4, the cloud configuration platform 11 determines that the authentication operation fails and performs the step S44.

If the authentication operation is determined to be successful in the step S42, the cloud configuration platform 11 further obtains the equipment data of the equipment 4 to be added from the ground configuration platform 21 (step S46). In some embodiments, the equipment data may be the basic data, such as the brand and model, of the equipment 4. In some other embodiments, the equipment data may be the complete data, such as the brand, model, specification, property, control command, communication interface and data transmitting format, etc., of the equipment 4. The manager may input the equipment data through corresponding page, such as the equipment configuration page 1130 in FIG. 6, provided by the ground configuration platform 21. Here is not intended to be limiting.

After the step S46, the cloud configuration platform 11 searches the equipment template infobase 114 and determines whether the equipment data of the equipment 4 is existent in the equipment template infobase 114 (step S48). If the equipment data of the equipment 4 is existent in the equipment template infobase 114, it indicates that the cloud configuration platform 11 does not need to update the equipment template infobase 114. On the other hand, if the equipment data of the equipment 4 is non-existent in the equipment template infobase 114, the cloud configuration platform 11 needs to update the equipment template infobase 114 to add the equipment 4 to the equipment template infobase 114.

Specifically, if the equipment data is determined to be non-existent in the equipment template infobase 114 in the step S48, the cloud configuration platform 11 authorizes the ground configuration platform 21 to use the cloud service module 116 shown in FIG. 2 (step S50). In some embodiments, the cloud service module 116 may be implemented in a software manner in the cloud configuration platform 11 and have the authority of modifying the equipment template infobase 114. After the step S50, the ground configuration platform 21 may modify the equipment template infobase 114 directly by the cloud service module 116 to add the equipment data provided the manager to the equipment template infobase 114 (step S52). After the step S52, the equipment template infobase 114 includes the equipment data of the equipment 4 to be added by the manager.

If the equipment data is determined to be existent in the equipment template infobase 114 in the step S48, or the equipment 4 is added to the equipment template infobase 114 by the ground configuration platform 21 through the step S50 and the step S52, the cloud configuration platform 11 re-authorizes the ground configuration platform 21 to use the cloud service module 116 shown in the FIG. 2 (step S54). In some embodiments, the cloud service module 116 has the authority of modifying the project established by the project management module 111. It should be noted that the cloud service module 116 used by the ground configuration platform 21 that is authorized by the cloud configuration platform 11 in the step S50 and the cloud service module 116 used by the ground configuration platform 21 that is authorized by the cloud configuration platform 11 in the step S54 may be the same module or different modules, here is not intended to be limiting.

After the step S54, the ground configuration platform 21 may modify the project data by the cloud service module 116, and obtain the equipment data of the equipment 4 to be added from renewed equipment template infobase, and add the equipment data to the project (step S56). After the step S56, the cloud configuration platform 11 stores modified project data to previously established cloud configuration file F1 by the cloud service module 116 to update the cloud configuration file F1 (step S58). After the step S58, the intelligent building system 2 imports renewed cloud configuration file F1 (step S62). Thus, the manager may obtain related data of newly added equipment 4 in the ground configuration procedure and deploy the equipment 4 to each planar region of the building.

In some specific circumstances, the manager may have the requirement of deploying the system non-existent in the cloud configuration file F1, such as the lighting system, air conditioning system, etc., to the building. In that circumstance, the manager needs to connect the intelligent building kit 3, that is not supported by the cloud configuration file F1, to the intelligent building system 2. One technical feature of this disclosure is that the integrated intelligent building management system further provides the manager with the function of directly adding required intelligent building kit 3 on the ground (i.e., with respect to the intelligent building system 2).

Figure 11:
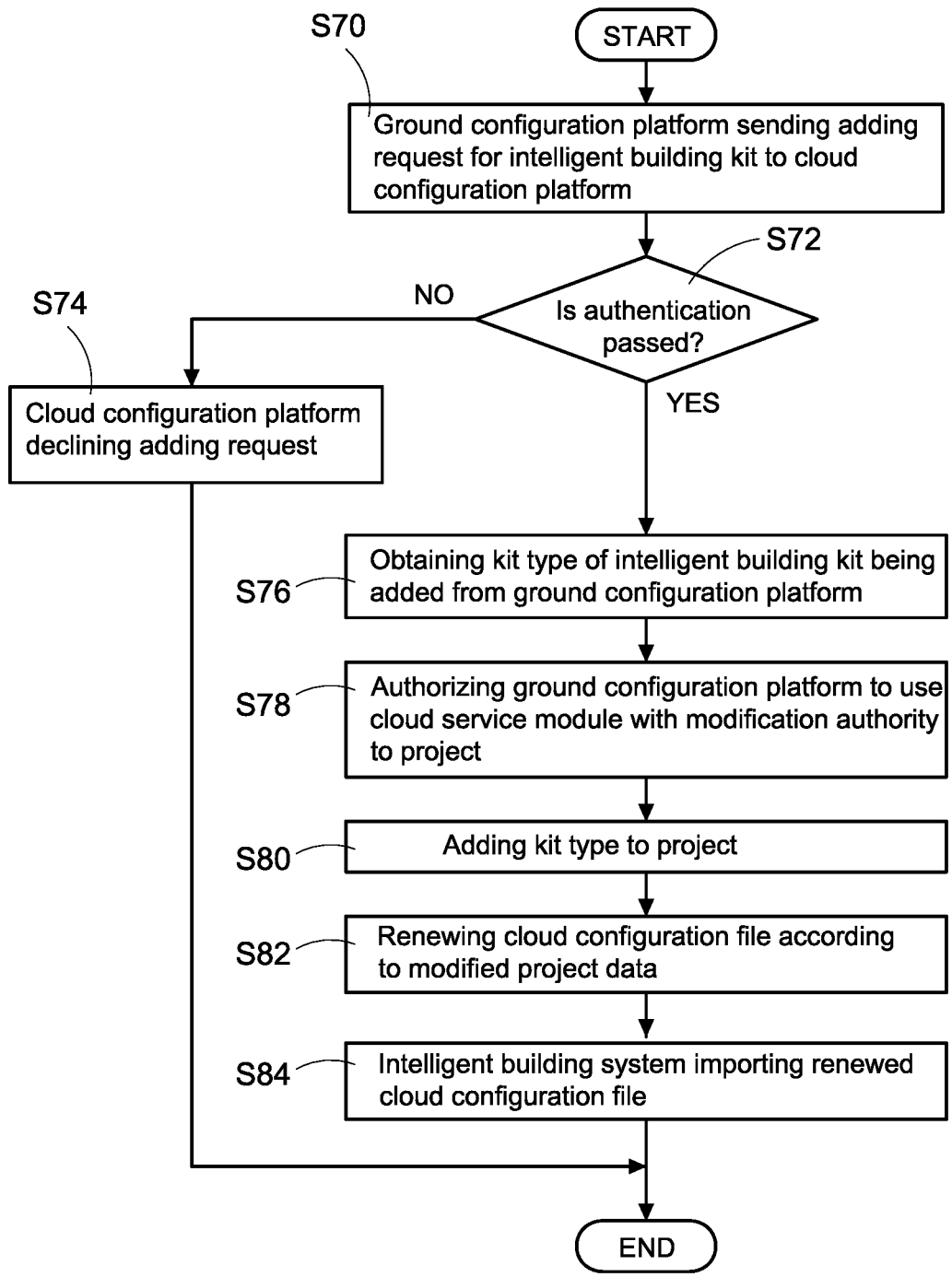
FIG. 11 is a ground adding flowchart in the second embodiment of this disclosure.

Refer together with FIG. 11, which is a ground adding flowchart in the second embodiment of this disclosure. As shown in FIG. 7, the ground configuration platform 21 may further include a kit adding module 220. Similarly, the kit adding module 220 may be implemented in a software manner in the ground configuration platform 21. When the manager executes the ground configuration procedure to the intelligent building system 2, if an intelligent building kit 3 needs to be connected and the kit category of the intelligent building kit 3 is non-existent in the cloud configuration file F1, the ground configuration platform 21 may execute every operation in FIG. 11 by the kit adding module 220 to assist the manager to complete the adding operation of the intelligent building kit 3 on the ground directly.

In this disclosure, after the intelligent building kit 3 communicating with the intelligent building system 2, the intelligent building kit 3 may automatically report the IP address and the kit category thereof to the intelligent building system 2. If the intelligent building system 2 determines that the kit category is non-existent in the cloud configuration file F1, the intelligent building system 2 may switch the kit category, such as switching to mix category, of the intelligent building kit 3. At the same time, the intelligent building kit 3 is unable to execute predetermined intelligent computing analytical capability.

For examples, if the manager only selects the air conditioning system in the cloud configuration procedure (i.e., the cloud configuration file F1 only includes the air conditioning system) and connects an intelligent building kit 3 with the kit category of lighting system to the intelligent building system 2 on the ground configuration procedure, the kit category of the intelligent building kit 3 is identified to be the mix category and the intelligent building kit 3 is unable to execute predetermined intelligent computing analytical capability. The aforementioned issue may be solved through the adding procedure in FIG. 11.

Specifically, as shown in FIG. 11, when the manager needs to add the intelligent building kit 3 unsupported by the cloud configuration file F1, the manager may send out command to the intelligent building system 2 through the specific interface (not shown in figures). When the intelligent building system 2 is trigger by the command, the intelligent building system 2 may send out the adding request of the intelligent building kit 3 to the cloud configuration platform 11 through the ground configuration platform 21 (step S70). When the cloud configuration platform 11 accepts the adding request, the cloud configuration platform 11 performs the authentication operation of the authorization certificate to the ground configuration platform 21 (step S72), and when the authentication operation fails the cloud configuration platform 11 sends out response of declining the request to the ground configuration platform 21 (step S74). The method of authentication operation performed by the cloud configuration platform 11 is similar to the embodiment in FIG. 10, here is omitted for brevity.

If the authentication operation is determined to be successful in the step S72, the cloud configuration platform 11 further obtains the kit category of the intelligent building kit 3 to be added from the ground configuration platform 21 (step S76). In some other embodiments, the cloud configuration platform 11 may obtain the intelligent computing analytical capability of the intelligent building kit 3 to be added in the step S76. Here is not intended to be limiting.

After the step S76, the cloud configuration platform 11 authorizes the ground configuration platform 21 to use the cloud service module 116 shown in FIG. 2 (step S78). In some embodiments, the cloud service module 116 may be implemented in a software manner in the cloud configuration platform 11 and have the authority of modifying the project established by the project management module 111. It should be noted that the cloud service module 116 used by the ground configuration platform 21 authorized by the cloud configuration platform 11 in the step S78 and the cloud service module 116 used by the ground configuration platform 21 authorized by the cloud configuration platform 11 in the step S50 shown in FIG. 10 may be the same module or different modules, here is not intended to be limiting.

After the step S78, the ground configuration platform 21 may modify the project data by the cloud service module 116, and add the kit category that needs to be added to the project (step S80). After the step S80, the cloud configuration platform 11 stores modified project data to previously established cloud configuration file F1 by the cloud service module 116 to update the cloud configuration file F1 (step S82). After the step S82, the intelligent building system 2 imports renewed cloud configuration file F1 (step S84). Thus, the manager may connect the intelligent building kit 3 with the kit category to the intelligent building system 2 in the ground configuration procedure and connect newly added equipment 4 with the specific category in the building by the intelligent building kit 3.

Figure 12:
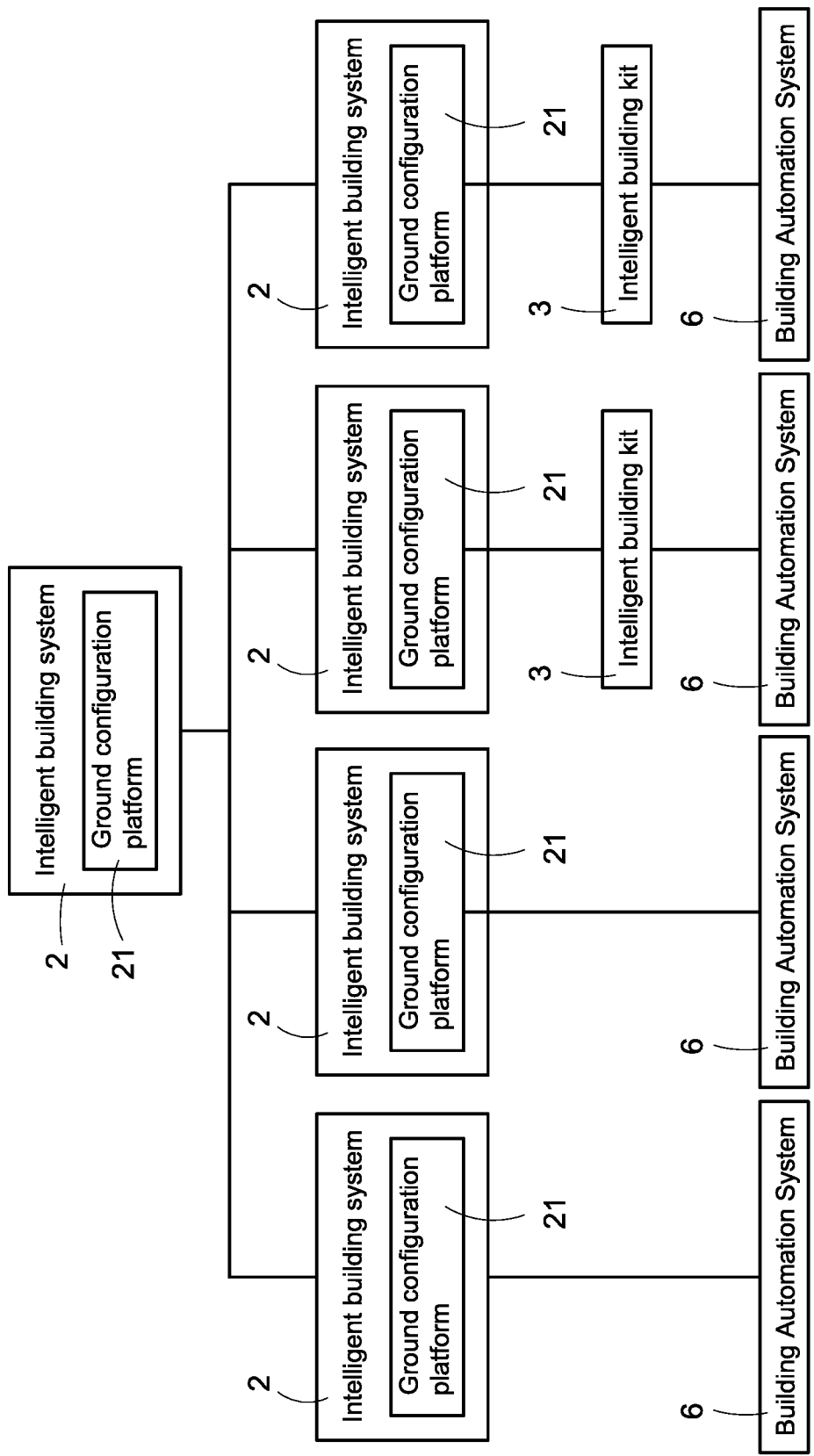
FIG. 12 is monitoring schematic view of multiple intelligent building systems in the first embodiment of this disclosure.

Refer to FIG. 12, which is monitoring schematic view of multiple intelligent building systems in the first embodiment of this disclosure. As shown in FIG. 12, the intelligent building system 2 disposed on the ground may further achieve the connection of multi-systems. Thus, the manager may carry out the management and monitoring function across different intelligent building systems 2 directly by the intelligent building system 2 without the cloud management system 1.

Specifically, in part of the arrangement scenario, the manager may have the requirement of incorporating or integrating existed building automation system (BAS) 6 of the building in part of the old project and interfacing with the BAS for transmitting data in part of the new project. Under the circumstance, the manger may use one or multiple intelligent building systems 2 of this disclosure as the relay layer to collect data of the BAS in the project, and to perform processing and computation, and further to transmit that to the other intelligent building systems 2, such as the intelligent building systems 2 corresponding to the other projects. Therefore, the manager may flexibly define the communication architecture layer of each intelligent building system 2 according to practical requirement of the project.

In this disclosure, the intelligent building systems 2 in each project may provide the same functions, the difference is that contents of the cloud configuration file F1 accepted and adopted in the ground configuration procedure are different respectively. As shown in FIG. 12, the intelligent building system 2 on the upper layer of the communication architecture layer may include the data of all of the intelligent building systems 2 on the lower layer. Thus, the equipment monitoring function across multi-systems is achieved.

In some embodiments, the intelligent building system 2 in the project may use connected intelligent building kit 3 as the relay to interface the data in the project to the intelligent building system 2. Specifically, in some of smaller project, the BAS 6 is used to receive position data, and the BAS does not need independent page and authority.

For examples, the air conditioning system of the first building is connected in by existed BAS 6 and the other systems of the first building are connected in by the intelligent building kit 3 in the first building. In some embodiments, air conditioning related data in the BAS 6 may be uploaded to the intelligent building system 2 in charge of the first building by the intelligent building kit 3, such as the intelligent building kit 3 with the kit category of converter, and be collectively configured by the intelligent building system 2 for the screen to be displayed and authority.

In some other embodiments, the manager may use the intelligent building system 2 as the relay to interface the data in the project to the other intelligent building systems 2. Specifically, in part of the large project, various data received by the BAS are not limited to the position data, and the BASs in charge of receiving data have independent pages and authorities respectively.

For examples, the data of the first building is received by the first building automatic system, and the data of the second building is received by the second building automatic system, and the data of the first and second buildings may be monitored independently. If the manager needs to integrate the data of the first and second buildings and display that collectively, the manager may use the first intelligent building system to connect in the data of the first building automatic system, and use the second intelligent building system to connect in the data of the second building automatic system, and configure the screen to be displayed and authorities respectively. Finally, configured data of the first and second intelligent building systems are uploaded to the third intelligent building system on the upper layer. Thus, the third intelligent building system on the upper layer may configure the monitoring screen across the first and second buildings and be used as the unified entrance for the manager to visit the first building and the second building directly.

As described above, each intelligent building system 2 of this disclosure may provide the same function. Therefore, each intelligent building system 2 may use the intelligent building system 2 on the upper layer to achieve the function of monitoring across multi-systems. Further, this disclosure may achieve the object of adding the intelligent building kit 3 without incorporating with the cloud management system 1.

Specifically, when the intelligent building kit 3 communicates with the first intelligent building system and the first intelligent building system determines that the kit category of the intelligent building kit 3 is non-existent in the cloud configuration file F1, the first intelligent building system may search and connect to the other intelligent building system, such as the second intelligent building system, supporting the kit category through the third intelligent building system on the upper layer. Thus, the first intelligent building system may replicate entire or part of the data from the cloud configuration file F1 of the second intelligent building system and renew the cloud configuration file F1 adopted during the configuration of the first intelligent building system according to that. As a result, renewed first intelligent building system supports the kit category.

In some embodiments, when the intelligent building system 2 determines that the kit category of connected intelligent building kit 3 at the very time is non-existent in the cloud configuration file F1, the intelligent building system 2 may submit search and update request to the intelligent building system 2 on the upper layer through the kit adding module 220 in FIG. 7. Here is not intended to be limiting.

For examples, if the manager only selects the air conditioning system with respect to the first intelligent building system in the cloud configuration procedure (i.e., the cloud configuration file F1 only includes the air conditioning system) and connect an intelligent building kit 3 with the kit category of lighting system to the first intelligent building system on the ground configuration procedure, the kit category of the intelligent building kit 3 is identified to be the mix category (because that is not supported by the first intelligent building system) and is unable to execute predetermined intelligent illuminating capability.

In some embodiments, the first intelligent building system may send out request to the third intelligent building system on the upper layer through the kit adding module 220 to search all of the intelligent building systems 2 connected under the third intelligent building system, and connect to the second intelligent building system that supports the kit category of lighting system. Further, the first intelligent building system may replicate entire or part of the data, such as the project data, in the cloud configuration file F1 of the second intelligent building system through the third intelligent building system, and update the cloud configuration file F1 of the first intelligent building system according to that.

The first intelligent building system may directly add the specific kit category to the cloud configuration file F1 without incorporating with the cloud management system 1 by the searching, connecting and updating operation. Thus, the intelligent building kit 3 with newly added kit category is supported and may execute predetermined capability without being identifying as the mix category.

With respect to the technical features of this disclosure, the manager may execute the ground configuration procedure following the cloud configuration file to increase configuration efficiency and decrease the risk of erroneous configuration. Further, the flexibility in the configuration operation may be increased by the adding procedure of the equipment 4/intelligent building kit 3.

While this disclosure has been described by means of specific embodiments, numerous modifications and variations may be made thereto by those skilled in the art without departing from the scope and spirit of this disclosure set forth in the claims.

What is claimed is:

1. An integrated intelligent building management system, comprising:
    a cloud management system, being a virtual system established on a cloud space and comprising a cloud configuration platform accepting an external operation to establish a plurality of cloud configuration files, each cloud configuration file recording a set of media access control address (MAC address);
    an intelligent building system, including a combination of physical computer or server and corresponding function software, corresponding to a building and comprising a ground configuration platform, the intelligent building system further comprising a set of specific MAC address and obtaining the cloud configuration file correspondingly based on the set of specific MAC address, wherein the ground configuration platform is confined by the cloud configuration file for a manager to perform a configuration procedure correspondingly and generate a ground configuration file;
    at least one equipment practically installed inside the building; and
    an intelligent building kit, being a programmable physical equipment, computer, or server, comprising a kit category, and connected to the at least one equipment disposed in the building and obtaining an equipment parameter of the equipment periodically based on a configuration;
    wherein when the intelligent building kit communicates with the intelligent building system, the ground configuration platform activates a configuration module correspondingly according to the kit category, the configuration module accepts the configuration from the manager to the intelligent building kit and generates the ground configuration file, and the intelligent building system exports the ground configuration file to the intelligent building kit to finish the configuration procedure for the intelligent building kit.

2. The integrated intelligent building management system of claim 1, wherein the cloud configuration platform comprises a project management module, the project management module accepts the external operation to configure a project name of a project, a building name of the building comprised by the project, the MAC address of the intelligent building system in charge of the building, and a plurality of platforms, a plurality of systems and a plurality of equipment required by the intelligent building system, and based on that to exclusively generate the cloud configuration file of the intelligent building system.

3. The integrated intelligent building management system of claim 2, wherein the project management module performs following operations to generate the cloud configuration file:
    obtaining and displaying a platform list, wherein the platform list comprises a plurality of platforms supported by the intelligent building system;
    selecting the plurality of platforms in the platform list required by the building according to the external operation;
    generating and displaying a system list, wherein the system list comprises a plurality of systems supported by the plurality of platforms being selected;
    selecting the plurality of systems in the system list required by the building according to the external operation;
    generating and displaying an equipment list, wherein the equipment list comprises a plurality of equipment supported by the plurality of systems being selected;
    selecting the plurality of equipment in the equipment list required by the building according to the external operation; and
    generating the cloud configuration file according to the project name, the building name, the MAC address, the plurality of platforms being selected, the plurality of systems being selected and the plurality of equipment being selected.

4. The integrated intelligent building management system of claim 3, wherein the cloud configuration platform comprises an equipment template infobase, the project management module accepts the external operation to select a brand and a model of each equipment in the equipment list, and to read an equipment data correspondingly in the equipment template infobase based on the brand and the model being selected to add to the cloud configuration file.

5. The integrated intelligent building management system of claim 4, wherein the equipment data comprises a category tag and a package tag of the equipment, the category tag records an equipment category of the equipment, the package tag records at least one of a specification, a property, a control command, a communication interface and a data transmission format of the equipment, and the project management module determines whether each equipment supports the plurality of systems being selected based on the equipment category.

6. The integrated intelligent building management system of claim 4, wherein the cloud configuration platform comprises an equipment management module accepting the external operation to configure an equipment data of a new equipment and adding the equipment data of the new equipment to the equipment template infobase.

7. The integrated intelligent building management system of claim 6, wherein the equipment management module provides a plurality of configuration pages corresponding to a plurality of communication protocol, when the external operation inputs a basic parameter of the new equipment to a specific page in the plurality of configuration pages, the equipment management module transforms the equipment data of the new equipment to a programming code of the communication protocol corresponding to the specific page based on the basic parameter, and stores the new equipment to the equipment template infobase based on the programming code.

8. The integrated intelligent building management system of claim 2, wherein the cloud configuration platform comprises a building information model (BIM) management module and a BIM database, the BIM management module receives a BIM file and performs a transformation procedure to the BIM file to add that to the BIM database, and the cloud configuration platform selects a specific BIM file corresponding to the building from the BIM database according to the external operation and adds the specific BIM file and an application program interface (API) correspondingly to the cloud configuration file, and the specific BIM file records an editable 3D image of the building.

9. The integrated intelligent building management system of claim 8, wherein the ground configuration platform comprises:
an area configuration module, providing the manager to define a plurality of planar regions;
a layout configuration module, providing the manager to configure a location coordinate of each equipment recorded in the cloud configuration file to deploy each equipment to each planar region respectively, and providing the manager to configure a control panel of each equipment to inspect a real-time information of each equipment on a front-end webpage connected by the intelligent building system and to operate each equipment; and
a BIM configuration module, reading the specific BIM file in the cloud configuration file for the manager to correspond a plurality of objects in the editable 3D image with each planar region, each system and each equipment being configured, and determining whether a deployment conflict occurs between each object, each planar region, each system and each equipment being linked during configuration.

10. The integrated intelligent building management system of claim 9, wherein the ground configuration platform comprises a virtual power meter configuration module, providing the manager to select a plurality of target power meters in the building, and to select a plus type, a minus type or a split type for generating a virtual power meter based on a power consumption indicated by the plurality of target power meters.

11. The integrated intelligent building management system of claim 10, wherein the ground configuration platform comprises a power meter connection configuration module for the user to connect the plurality of target power meters in the building by a tree structure to establish an energy flow diagram of the building.

12. The integrated intelligent building management system of claim 9, wherein the ground configuration platform comprises a group configuration module for the user to assemble the plurality of equipment with a same brand and a same model to one group, and permits the intelligent building system to release a grouped control command to control the plurality of equipment in a same group simultaneously.

13. The integrated intelligent building management system of claim 9, wherein the ground configuration platform comprises a schedule configuration module for the user to configure a schedule of each equipment in the building, and performs a conflict check operation to the schedule of each equipment through a conflict check unit, the conflict check operation is adapted to confirm each equipment performing one operation at a same time point and output an alarm signal when a conflict occurs in any one schedule of any one equipment.

14. The integrated intelligent building management system of claim 13, wherein the conflict check operation comprises a first conflict check operation performing during configuring the schedule of each equipment, a second conflict check operation performing during deploying the schedule of each equipment to a perpetual calendar, and a third conflict check operation performing during reactivating any one schedule of any one equipment being deactivated.

15. The integrated intelligent building management system of claim 9, wherein the intelligent building kit comprises a specific kit category based on a pre-configuration and is embedded with an intelligent computing analytical capability correspondingly, the intelligent building kit automatically reports an internet protocol (IP) address and the specific kit category to the intelligent building system during establishing a communication with the intelligent building system; wherein the intelligent building system determines whether the specific kit category is recorded in the cloud configuration file, when the specific kit category is recorded in the cloud configuration file, the intelligent building system activates a capability configuration module correspondingly to configure the intelligent building kit, and when the specific kit category is unrecorded in the cloud configuration file, the intelligent building system modifies the specific kit category of the intelligent building kit and forbids usage of the intelligent computing analytical capability.

16. The integrated intelligent building management system of claim 15, wherein the intelligent building kit comprises a computing unit computing the equipment parameter being obtained through the intelligent computing analytical capability, and the intelligent building kit uploads a computed data to the intelligent building system.

17. The integrated intelligent building management system of claim 15, wherein the ground configuration platform comprises a kit adding module jointly performing following operations with the cloud configuration platform when the specific kit category is unrecorded in the cloud configuration file, the operations comprise:

the ground configuration platform outputting an adding request to the cloud configuration platform;

the cloud configuration platform performing an authentication operation of an authorization certificate to the ground configuration platform;

the cloud configuration platform declining the adding request when the authorization certificate fails the authentication operation;

the cloud configuration platform permitting the ground configuration platform to obtain the specific kit category when the authorization certificate passes the authentication operation;

the cloud configuration platform authorizing the ground configuration platform to use a cloud service module, wherein the cloud service module is used to modify a project data of a project comprising the building;

the ground configuration platform modifying the project data by the cloud configuration platform to add the specific kit category, a corresponding platform and a corresponding system to the project;

the cloud configuration platform storing the project data being modified to the cloud configuration file by the cloud service module to generate a renewed cloud configuration file; and the intelligent building system importing the renewed cloud configuration file.

18. The integrated intelligent building management system of claim 15, wherein the ground configuration platform comprises a kit adding module, the kit adding module searches and connects to another intelligent building system supporting the specific kit category when the specific kit category is unrecorded in the cloud configuration file, and duplicates all or part data of the cloud configuration file of the another intelligent building system, and renews the cloud configuration file of the intelligent building system based on that.

19. The integrated intelligent building management system of claim 9, wherein the ground configuration platform comprises an equipment adding module jointly performing following operations with the cloud configuration platform when a specific equipment required by the building is unrecorded in the cloud configuration file, the operations comprise:

the ground configuration platform outputting an adding request to the cloud configuration platform;

the cloud configuration platform performing an authentication operation of an authorization certificate to the ground configuration platform;

the cloud configuration platform declining the adding request when the authorization certificate fails the authentication operation;

the cloud configuration platform permitting the ground configuration platform to obtain an equipment data of the specific equipment when the authorization certificate passes the authentication operation;

the cloud configuration platform determining whether the equipment data of the specific equipment is existent in an equipment template infobase;

if the equipment data of the specific equipment is existent in an equipment template infobase, the cloud configuration platform authorizing the ground configuration platform to use a cloud service module, wherein the cloud service module is used to modify a project data of a project comprising the building;

the ground configuration platform modifying the project data by the cloud configuration platform to obtain the equipment data of the specific equipment from the equipment template infobase and add that to the project;

the cloud configuration platform storing the project data being modified to the cloud configuration file by the cloud service module to generate a renewed cloud configuration file; and the intelligent building system importing the renewed cloud configuration file.

20. The integrated intelligent building management system of claim 19, wherein when the cloud configuration platform receives the adding request and determines that the equipment data of the specific equipment is nonexistent in the equipment template infobase, the cloud configuration platform further jointly performs following operations with the ground configuration platform, the operations comprise:

the cloud configuration platform authorizing the ground configuration platform to use a second cloud service module, wherein the second cloud service module is used to modify the equipment template infobase;

the ground configuration platform modifying the equipment template infobase by the second cloud service module to add the equipment data of the specific equipment to the equipment template infobase;

the cloud configuration platform authorizing the ground configuration platform to use the cloud service module;

the ground configuration platform modifying the project data by the cloud service module to obtain the equipment data of the specific equipment from the equipment template infobase being modified and add that to the project;

the cloud configuration platform storing the project data being modified to the cloud configuration file by the cloud service module to generate the renewed cloud configuration file; and the intelligent building system importing the renewed cloud configuration file.

\* \* \* \* \*